(12) United States Patent
Kim et al.

(10) Patent No.: US 6,377,622 B1
(45) Date of Patent: Apr. 23, 2002

(54) METHOD AND APPARATUS FOR CODING/ DECODING SCALABLE SHAPES BY USING SCAN INTERLEAVING

(75) Inventors: Jong-Deuk Kim; Sung-Moon Chun, both of Kyoungki-do; Jae-Won Chung; Joo-Hee Moon, both of Seoul, all of (KR)

(73) Assignee: Hyundai Electronics Ind. Co., Ltd., Kyoungki-Do (KR)

( * ) Notice: Subject to any disclaimer, the term of this patent is extended or adjusted under 35 U.S.C. 154(b) by 0 days.

(21) Appl. No.: 09/109,959

(22) Filed: Jul. 2, 1998

(30) Foreign Application Priority Data

Jul. 2, 1997 (KR) ............................................. 97-30727

(51) Int. Cl.[7] ................................................. H04B 1/66
(52) U.S. Cl. ........................................ 375/240; 382/243
(58) Field of Search ............................. 375/240, 240.09, 375/240.24, 240.17, 240.25; 348/408.1, 410.1, 385.1, 397.1, 414.1, 420.1, 440.1, 384.1, 409.1; 382/243, 242, 268, 240; 345/441, 468

(56) References Cited

U.S. PATENT DOCUMENTS

| | | | |
|---|---|---|---|
| 5,428,693 A | | 6/1995 | Murakami et al. |
| 5,742,343 A | | 4/1998 | Haskell et al. |
| 5,764,808 A | * | 6/1998 | O'Connell et al. ......... 382/242 |
| 5,821,986 A | * | 10/1998 | Yuan et al. .............. 348/14.12 |
| 5,838,830 A | * | 11/1998 | Qian et al. .................. 382/243 |
| 5,853,506 A | * | 9/1999 | Kalra et al. ............. 375/240.24 |
| 6,002,803 A | * | 12/1999 | Qian et al. .................. 382/242 |
| 6,011,872 A | * | 1/2000 | Qian et al. .................. 382/243 |
| 6,028,634 A | * | 2/2000 | Yamaguchi et al. ........ 382/242 |
| 6,088,061 A | * | 7/2000 | Katara et al. .......... 375/240.25 |
| 6,198,508 B1 | * | 3/2001 | Jang et al. ............... 348/391.1 |

* cited by examiner

*Primary Examiner*—Chris Kelley
*Assistant Examiner*—Grims Philippe
(74) *Attorney, Agent, or Firm*—Lackenbach Siegel Marzullo Aronson & Greenspan

(57) ABSTRACT

A plurality of layers having other resolution are coded in order to encode scalably shape information. A base layer having the lower resolution is coded and transmitted to a decoder, and an enhancement layer is coded by employing a scan interleaving method from the base layer. A scan order of vertical and horizontal scannings is decided according to a generation frequency of TSD (transitional sample data) and ESD (exceptional sample data) and the number of coding bits on the base layer, or a type of boundary lines on images. When the scan order is decided, additional information indicating the scan order is transmitted to the decoder. The base layer is also coded and transmitted to the decoder. In case that the scan order is decided according to the horizontal and vertical of the boundary lines on an image of the base layer, it is no need to transmit the additional information indicating the scan order on the received base layer and execute the decoding in the same order as the coded scan order.

24 Claims, 24 Drawing Sheets

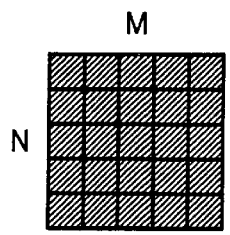
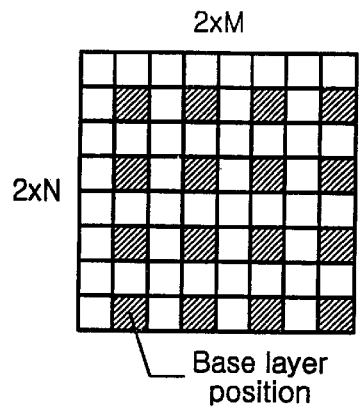
Base layer
Enhancement layer
FIG. 3(a)
(PRIOR ART)
FIG. 3(b)
(PRIOR ART)
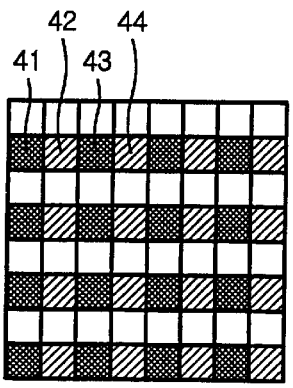
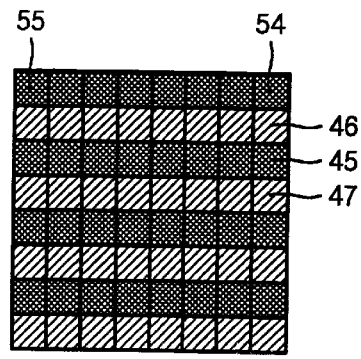
FIG. 4(a)
(PRIOR ART)
FIG. 4(b)
(PRIOR ART)
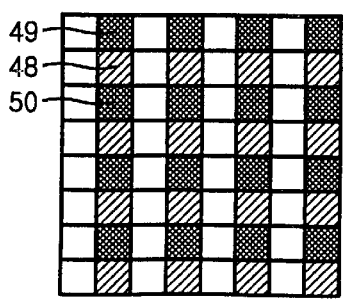
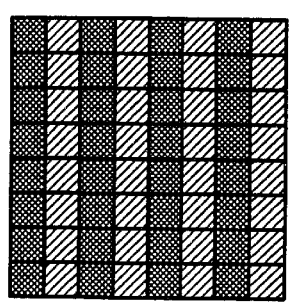
FIG. 4(c)
(PRIOR ART)
FIG. 4(d)
(PRIOR ART)

(a) 6pixels (b) 8pixels

METHOD AND APPARATUS FOR CODING/ DECODING SCALABLE SHAPES BY USING SCAN INTERLEAVING

BACKGROUND OF THE INVENTION

1. Field of the Invention

The present invention relates to a coding and decoding of shape information for motional images, and more particularly, to an apparatus and method for scalably coding/ decoding shapes by utilizing a scan interleaving method in which a scanning order of vertical and horizontal scannings is applied differently from each other in scalably coding/ decoding the shapes.

2. Discussion of Related Art

In encoding scalably shape information it is an art that a plurality of layers having each different resolution are coded and transmitted and decoded. Such art has been required in various art fields. In coding a plurality of layers having each different resolution there are types of a spatial scalability and a temporal scalability.

FIG. 1 shows a conceptual diagram providing the spatial scalable coding method. A base layer has a lower spatial resolution and an enhancement layer has a high spatial resolution. A general coding method is used on the base layer. On an enlargement layer, meanwhile, images on the base layer are up-sampled, that is, the images on the base layer become a screen having a high resolution through an interpolation, and images of size equal to images on the enhancement layer are provided thereon. Thus a coding having a high efficiency can be realized by predicting not only the images from the enhancement layer but also the interpolated images from the enlargement layer. White arrow marks shown in FIG. 1 indicate a direction of a prediction.

A compression efficiency is high in case that an image of an object is separated from its background then is coded. In order to code only an object separately like this, it needs to encode shape information for separating an object from a background on an image, separately from information of luminance and color signals in each of pixels constituting the object. The shape information is a binary image indicating the interior and the exterior of the object. That is, the interior of object may be as "1" and the exterior of object may be as "0".

In the scalable coding process, not only color information but also shape information is available to be encoded. In coding to an image of an enhancement layer through a use of an image on a base layer, there are cases of using an intra image and a predicted image. In the shape information scalable coding method, in case of using intra shape information of a base layer, a scan interleaving method is employed representatively.

FIG. 2 is a basic conceptual diagram of the scan interleaving for coding from a base layer to an enhancement layer. Rows of the first, third and fifth are reference scan lines and their values are known to a coder and a decoder. Their values may be pixel values of the base layer. The second and fourth rows are cord scan lines to be coded by the coder. In order to code a pixel value of a cord scan line, pixel values of two upper and lower reference scan lines are scanned. The correlation between the reference scan lines and the cord scan lines is as follows.

There is a case that pixel values of two scan lines and a pixel value of a cord scan line are same. In such a case, shape information has a value of "0" on the background and a value of "1" on the object, or has its opposite value. Most pixels to be coded are included into such a case. There is a case that pixel values on two reference scan lines are different from each other and this case is as a transitional sample, in which the pixel values should be coded. A position which the transitional sample is generated can be noted through the reference scan lines, thus the position information does not need to be transmitted. There is also a case that pixel values on two reference scan lines are same as each other meantime are different from a pixel value on a cord scan line. Such a case is as an exceptional sample, in which position information of the pixel that the exceptional sample is generated should be transmitted, meantime a pixel value does not need to be transmitted since it has a value opposite against pixel values of reference lines.

Accordingly, in employing a scan interleaving method in order for coding a base layer to an enhancement layer, two kinds of data, a transitional sample data (hereinafter, referred to as "TSD") and an exceptional sample data (ESD) should be coded.

Referring to FIGS. 3(a) and 3(b), it shows a resolution of a base layer and an enhancement layer respectively. The enhancement layer has twice higher resolution all in the width and length directions than the base layer. If the base layer has a resolution of M×N, the enhancement layer has a resolution of (2×M)×(2×N). A pixel position of the base layer is constructed so that it may have a position value of the right lower of each of 2×2 blocks on the enhancement layer. Parts with one set of lines in FIG. 3(b) become each position of pixels which constitute the base layer. In order to encode the enhancement layer by using the base layer, white blocks in FIG. 3(b) should be coded. At this time, parts with one set of lines are same as the value on the base layer, thus there is no need to code the parts with one set of lines again. The parts with one set of lines are utilized when the enhancement layer is coded.

There needs two steps to encode the enhancement layer. FIGS. 4(a) to 4(d) represent vertical and horizontal scannings to code the enhancement layer.

As shown in FIG. 4(a), first, left and right pixel values of the base layer as pixels with one set of lines are used as reference values in coding parts with two sets of lines of the enhancement layer. As shown in FIG. 4(b), next, upper and lower pixel values of pixels shown as parts with one set of lines and encoded with the base layer at the first step are utilized as reference values to encode parts with two sets of lines on the enhancement layer.

In another method, as shown in FIG. 4(c), upper and lower pixel values of the base layer shown as parts with one set of lines are used as reference values in order to encode parts with two sets of lines of the enhancement layer. Then, as shown in FIG. 4(d), left and right pixel values of pixels shown as parts with one set of lines and coded with the base layer at the first step are utilized as reference values in order to encode parts with two sets of lines of the enhancement layer.

In two steps for coding an enhancement layer, the method for using left and right pixel values as a reference value is a horizontal scanning, and the method for using upper and lower pixel values as a reference value is a vertical scanning.

The scan interleaving method has two scanning steps as afore-mentioned. In its scanning order there may be also two methods that the vertical scanning is first progressed and the horizontal scanning is next progressed, and the horizontal scanning is first progressed then the vertical scanning is next progressed. At present, one of such two scanning methods in the scan interleaving method is selected and used.

In using the scan interleaving method, two kinds of data, TSD and ESD, should be coded. A main cause for deciding coding information quantity in the scan interleaving method is influenced by generation quantity of the TSD and ESD. That is to say, the smaller the TSD and ESD are generated, the smaller the coding information quantity becomes. By the way, the generation quantity of the TSD and ESD in coding may become different according to a shape of shape information by an order of the vertical and horizontal scannings. To code the enhancement layer, as shown in FIG. 4(a) to 4(d), the scanning should be progressed two times as the vertical and horizontal scannings. In such scannings, the number of coding pixels in the second scanning is more twice than the first scanning regardless an order of the vertical and horizontal scannings. Its reason is that pixels of the enhancement layer are coded in the first scanning referring to pixels of the base layer which are positioned skipping over each one block as shown in FIGS. 4(a) and 4(c), and pixels already noted about their values through the first scanning are coded in succession in the second scanning. As shown as parts with two sets of lines in FIGS. 4(a) to 4(d), 16 pixels in FIGS. 4(a) and 4(c) indicating the first scanning should be scanned, and 32 pixels in FIGS. 4(b) and 4(d) indicating the second scanning should be scanned.

FIGS. 5(a) to 5(d) provides a generation state of TSD and ESD based on an order of a scanning direction for shape information having many vertical boundary lines. FIGS. 5(a) and 5(b) show a method that the horizontal scanning is first executed and the vertical scanning is next performed. FIGS. 5(c) and 5(d) show a method the vertical scanning is first executed and the horizontal scanning is next performed. In case that the horizontal scanning is first performed and the vertical scanning is executed next, 4 TSD's are generated in FIG. 5(a) as the first scanning process. In FIG. 5(b) as the second scanning process, 1 TSD is generated. Thus the total 5 TSD's are generated. In FIG. 5(b), a successive display of pixels is available through known pixel values on reference scan lines since pixels positioned between pixels constituting the base layer are scanned through the horizontal scanning. On the contrary, in case that the vertical scanning is first performed and the horizontal scanning is executed next, 1 TSD is generated in the first scanning and 8 TSD's are generated in the second scanning. Thus the total 5 TSD's are generated. Thus the total 9 TSD's are generated.

Accordingly, in case that a boundary line on shape information is a vertical direction, the generation quantity of TSD may be less in a scanning order which the horizontal scanning first and the vertical scanning next are executed. In case that its boundary line is a horizontal direction, a scanning order which the vertical scanning first and the horizontal scanning next are executed, may make the generation quantity of the TSD less.

Like this, the TSD and ESD may be generated in its quantity more than an opposite scanning order since the generation quantity of the TSD and ESD can become different according to such scanning order, if the scanning order is constantly fixed. That is, a coding efficiency falls since the bit quantity in such a case becomes more than the opposite scanning order.

SUMMARY OF THE INVENTION

Accordingly, the present invention is directed to an apparatus and method for scalably coding/decoding shapes through a way of a scan interleaving that substantially obviate one or more of the problems due to limitations and disadvantages of the related art.

An object of the present invention is to provide an apparatus and method for coding/decoding scalably shapes, which are capable of improving a coding and decoding efficiency, by applying a scanning order of vertical and horizontal scannings differently from each other to an image coding through a way of a scan interleaving, in coding images from a base layer and to an enhancement layer.

Another object of the present invention is to provide an apparatus and method for coding/decoding scalably shapes by utilizing a scan interleaving way in which a scanning order based on a boundary line direction of a base layer can be decided so that coding bits may be generated in the small quantity.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a scanning order of horizontal and vertical scannings is differently applied to an image coding from a base layer to an enhancement layer through a use of a scan interleaving way. The scanning order is decided by a direction of a boundary line, the number of TSDs, the number of ESDs, the sum of the TSD and ESD, the number of bits when the TSD was coded, the number of bits when the ESD was coded, the number of bits when the TSD and ESD were coded, and the total number of coding bits. Additional information having such decided scanning order and coding information are transmitted to a decoder. The decoder receives this additional information and decodes it in the scanning order. The additional information indicating the scanning order is coded by using a fixed length coding, a variable length coding, a fixed arithmetic coding and a variable arithmetic coding method.

The additional information representing a scanning order, which is transmitted to each block, has much importance in the total. There is thus presented a method using a characteristic of a boundary line of a base layer as a method that the additional information for a scanning order is not transmitted. A coder and decoder can decide the same scanning order in a case of using only the base layer since the coder and decoder have the same base layer. That is, there is no need to transmit the additional information of the scanning order.

In another method for applying a scanning order differently, the coding and decoding can be done by fixing the scanning order and moving symmetrically coded blocks or rotating the coded blocks 90 degrees centering on a diagonal line. That is to say, in case that the scanning order requires a preferential execution of a horizontal scanning or a preferential execution of a vertical scanning, the coding and decoding is realized by symmetrically moving coding blocks in a direction of a diagonal line or rotating the coding blocks 90 degrees under a state that the scanning order is fixed.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings:

FIGS. 3(a) and 3(b) provide the resolution of a base layer and an enhancement layer.

FIGS. 4(a) to 4(d) set forth vertical and horizontal scannings in coding an enhancement layer.

FIGS. 5(a) to 5(d) illustrate the generation state of transitional and exceptional sample data (TSD and ESD) in scanning shape information having many vertical boundary lines in order.

Figure 1:
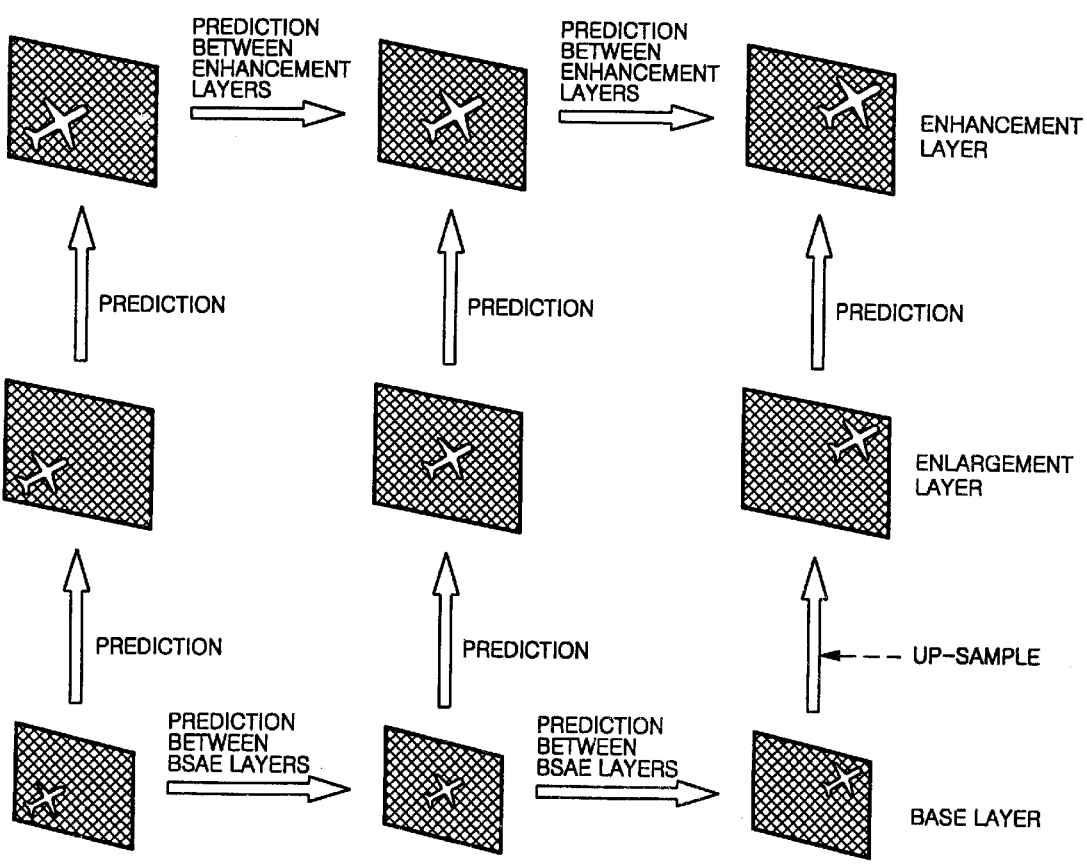
FIG. 1 shows a conceptual diagram illustrating spatial scalabilities.
Figure 2:
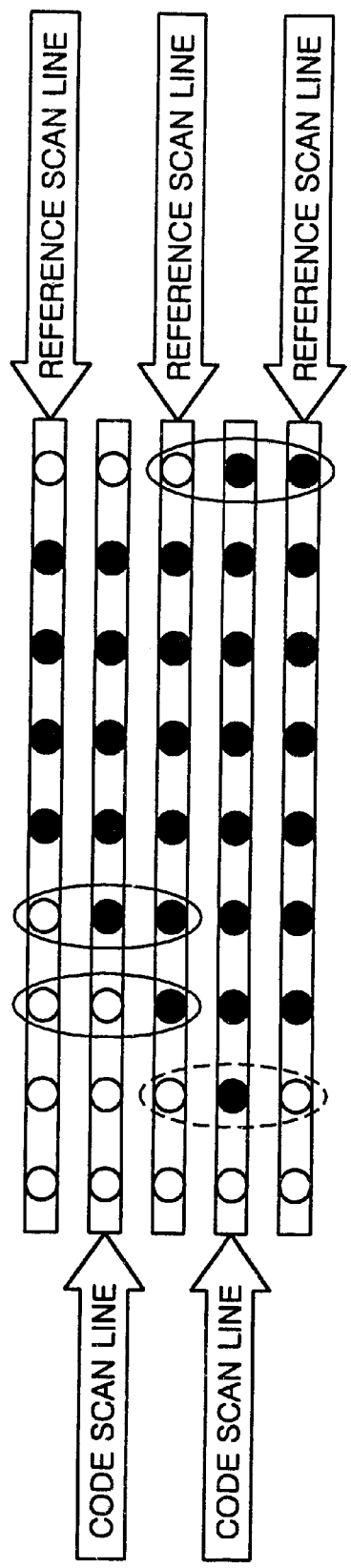
FIG. 2 depicts a basic conceptual diagram of a scan interleaving for coding base layers to enhancement layers.
Figure 5A:
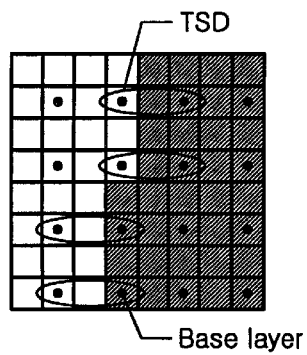
Figure 5B:
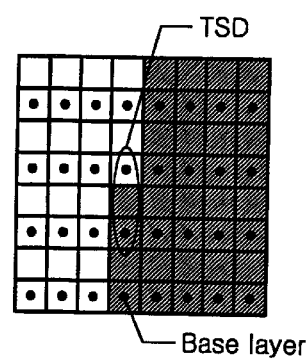
Figure 5C:
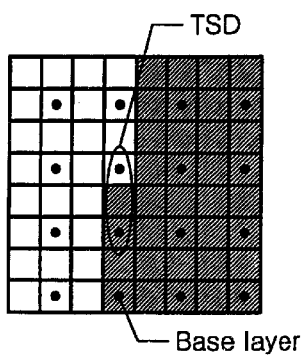
Figure 5D:
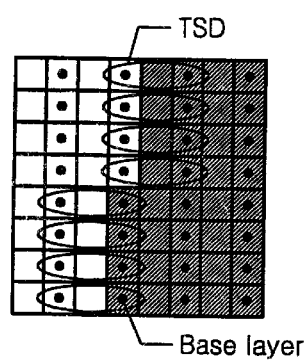
Figure 6:
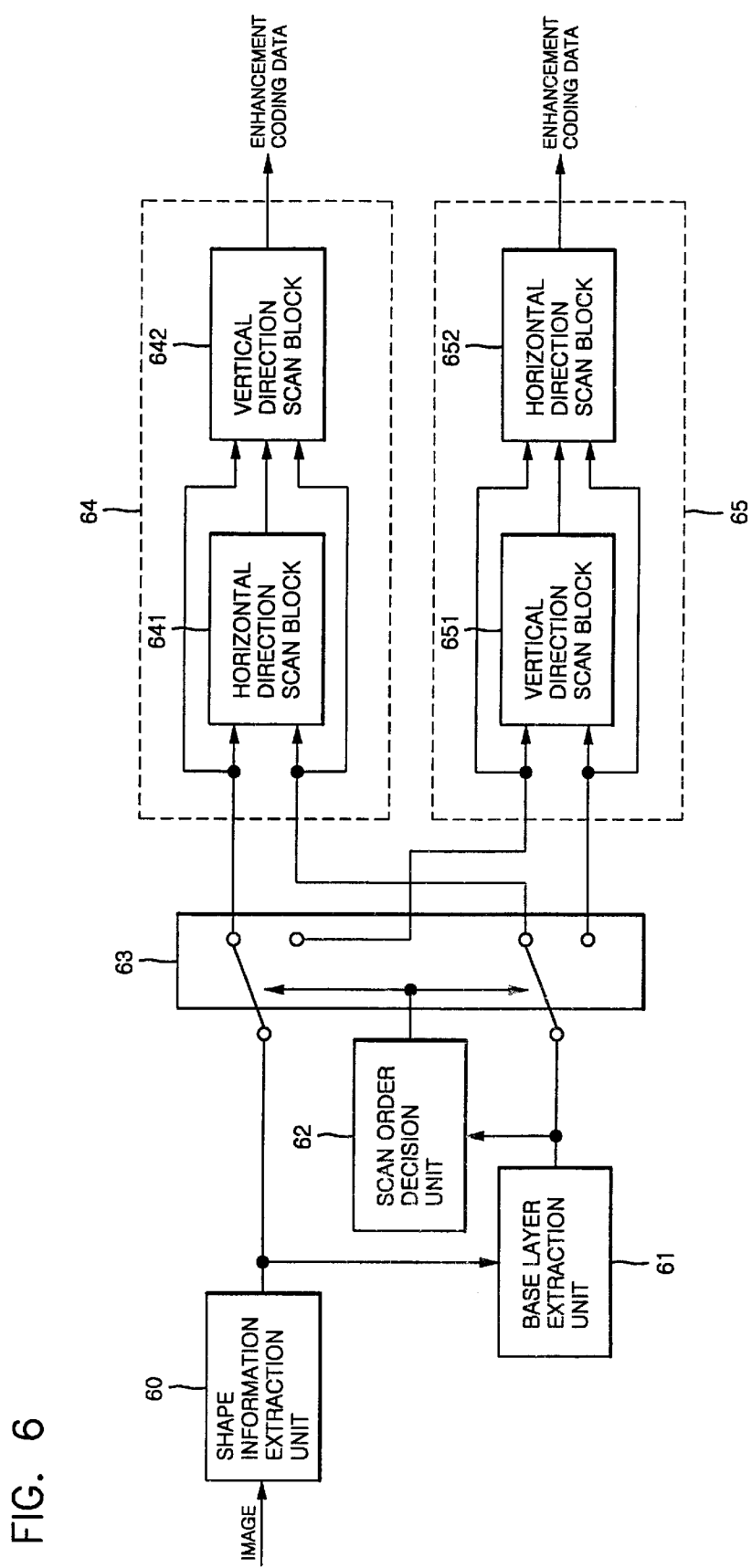

FIG. 6 offers a block diagram showing the construction of one embodiment for a scan interleaving coder in accordance with the present invention.

Figure 7:
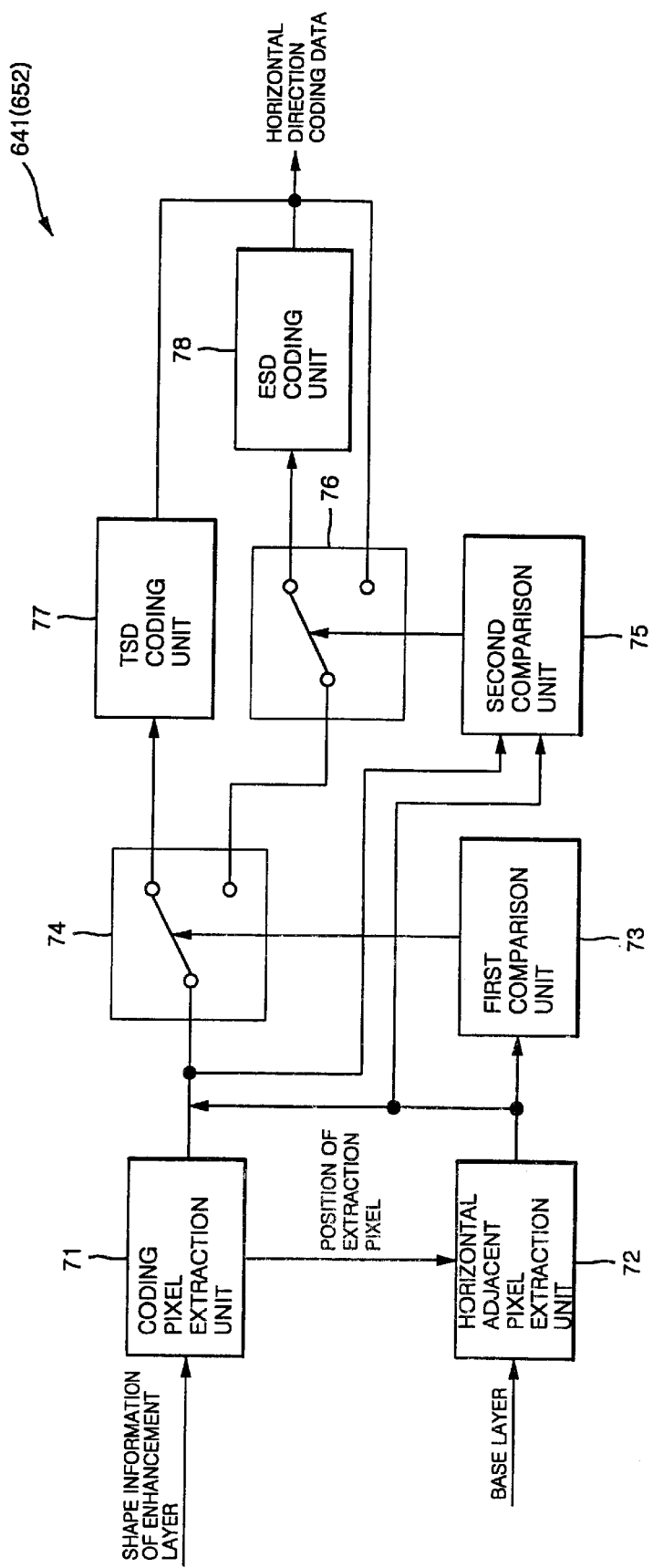

FIG. 7 is a block diagram providing one embodiment of a horizontal scanning unit in the invention.

Figure 8:
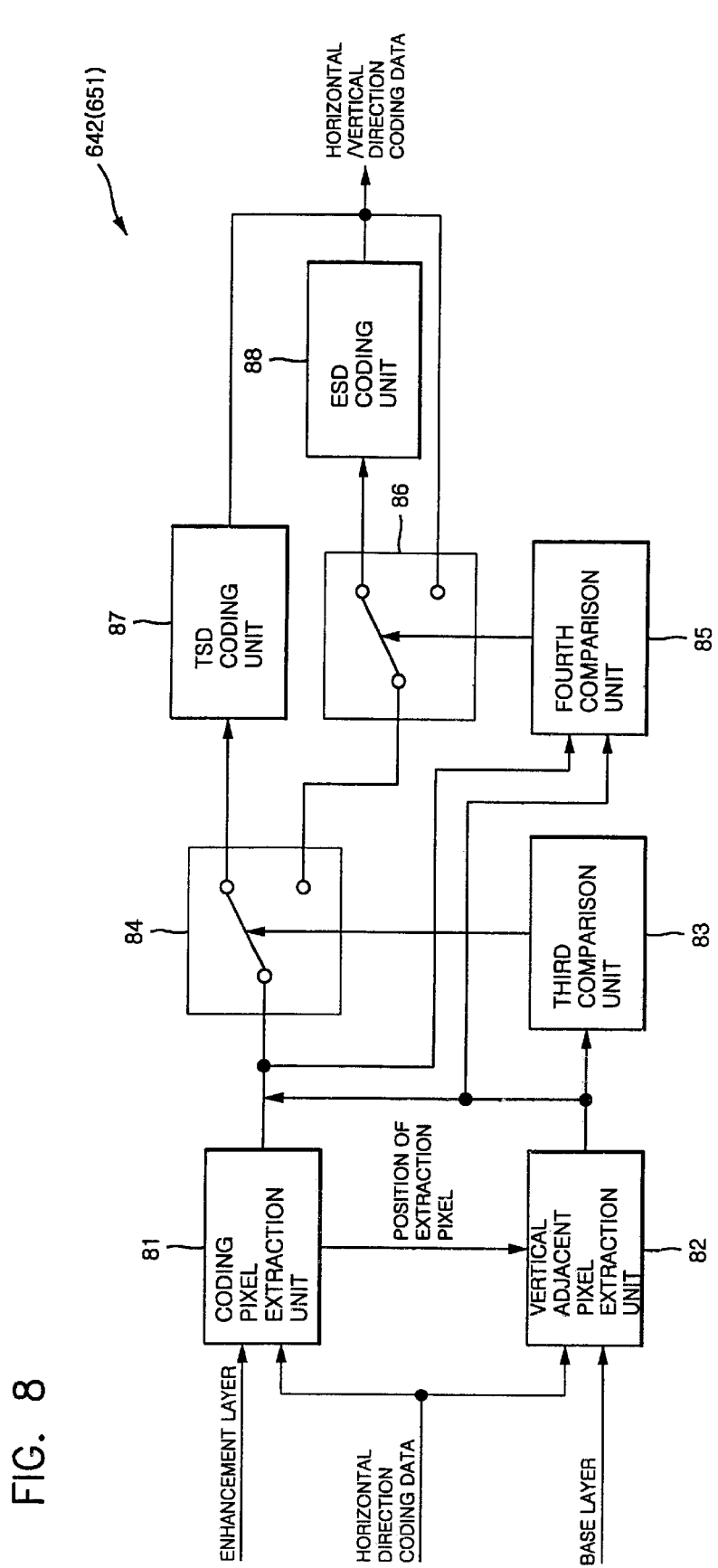

FIG. 8 indicates a block diagram showing one embodiment of a vertical scanning unit in the invention.

Figure 9:
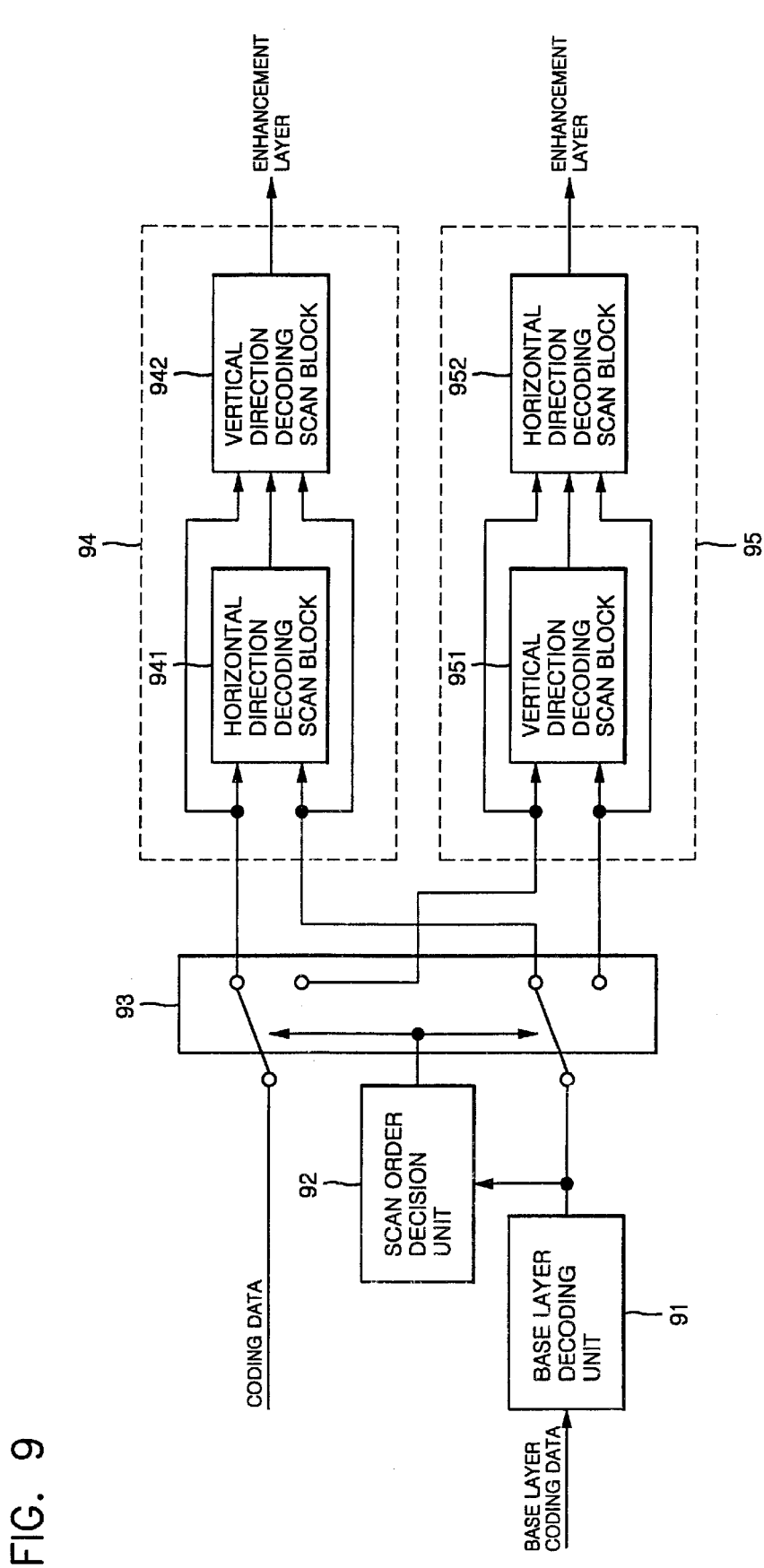

FIG. 9 provides a block diagram presenting the construction of one embodiment for a scan interleaving decoder in accordance with the present invention.

Figure 10:
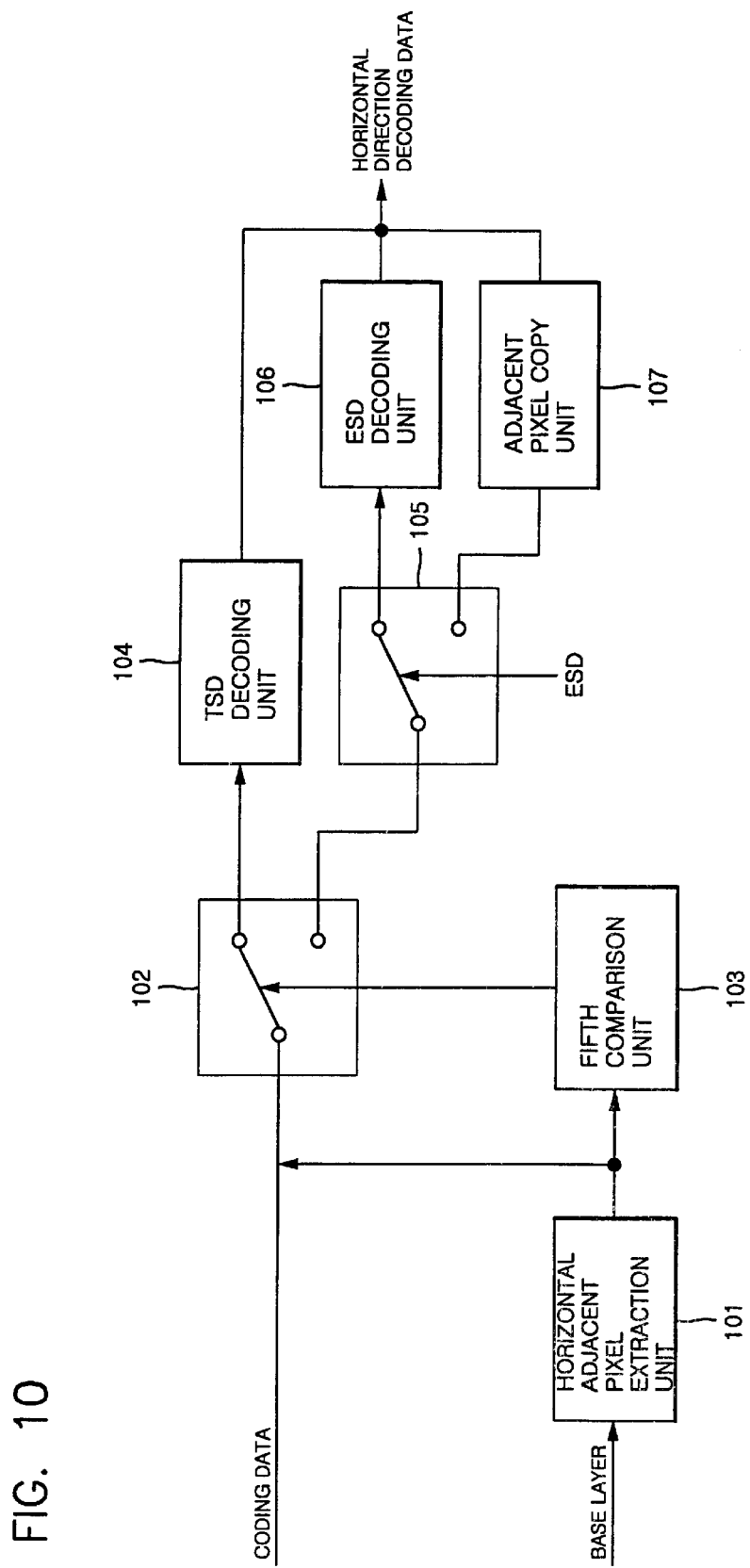

FIG. 10 is a block diagram showing one embodiment of a horizontal direction decoding scan unit in the invention.

Figure 11:
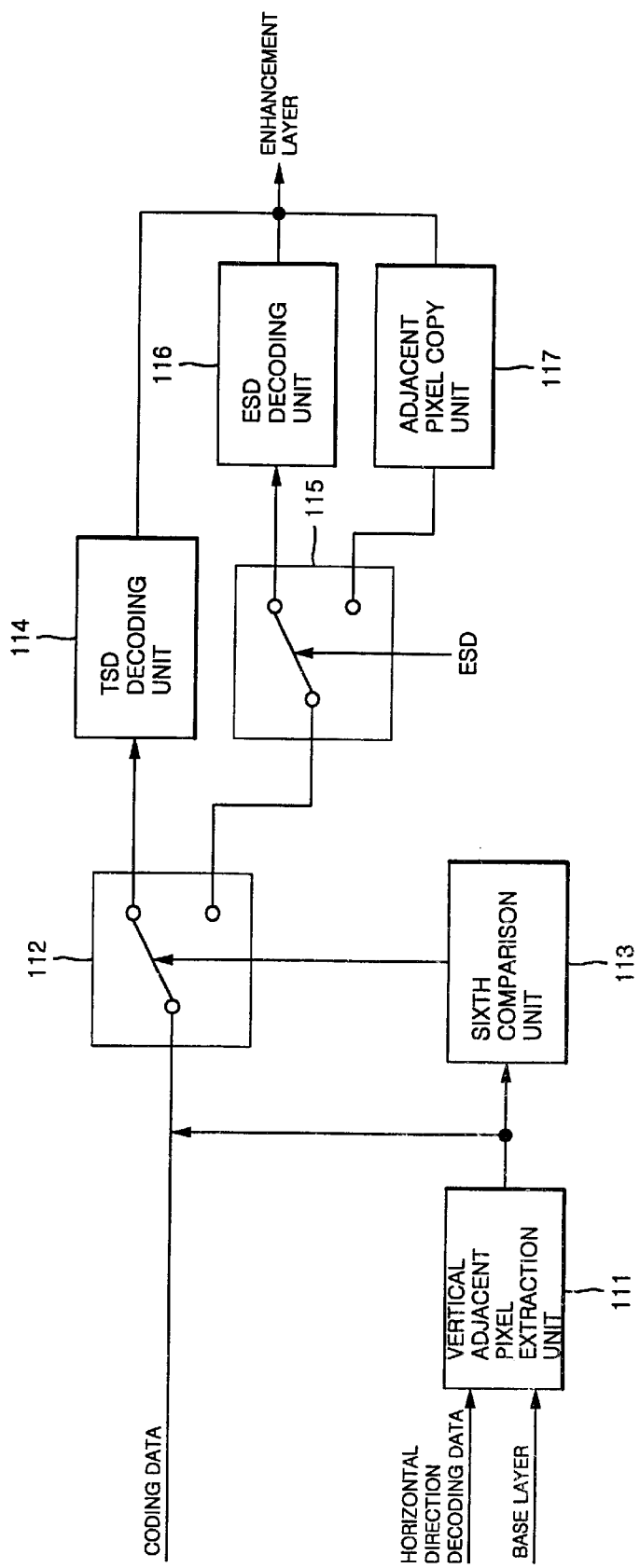

FIG. 11 indicates a block diagram providing one embodiment of a vertical direction decoding scan unit in the present invention.

Figure 12:
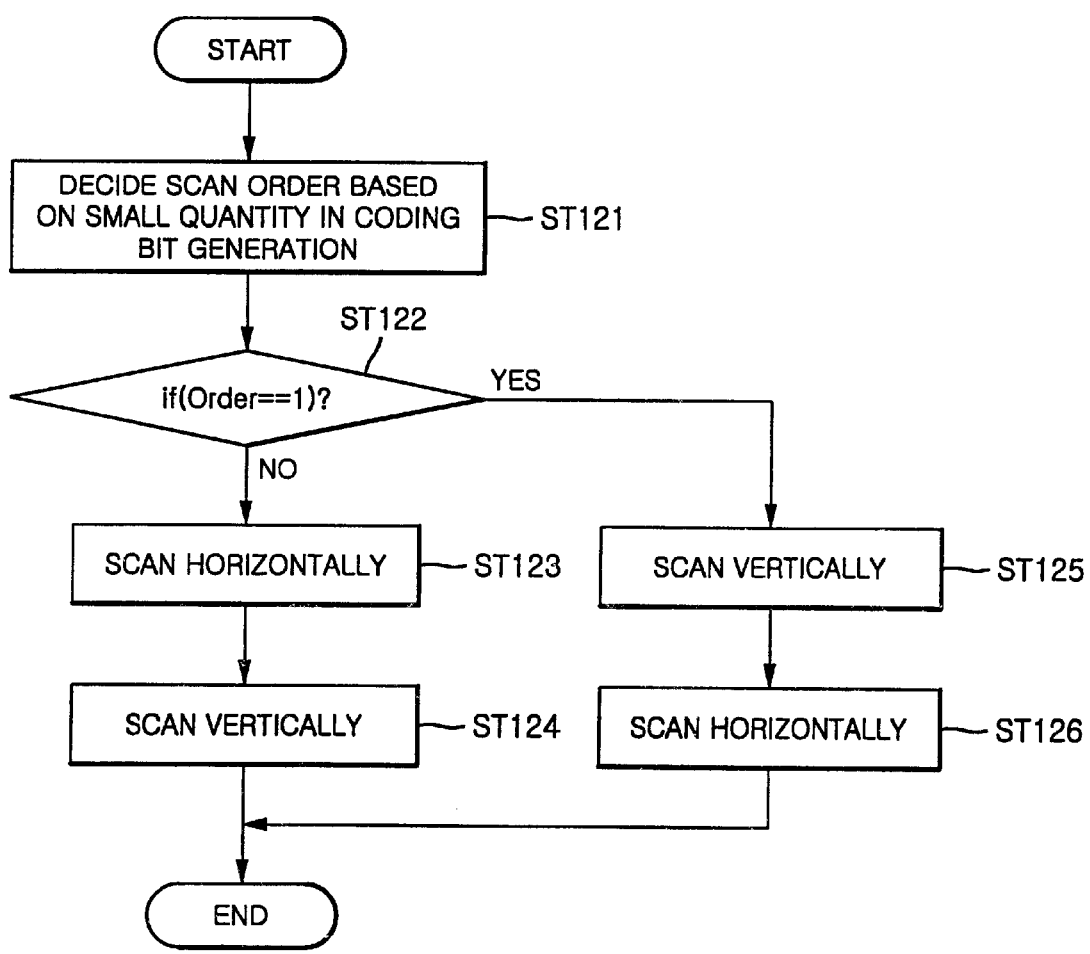

FIG. 12 is a flow chart showing a method for coding scalably shapes by utilizing an inventive scan interleaving method.

Figure 13:
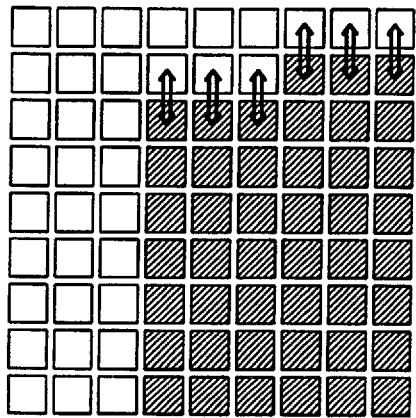
Figure 13:
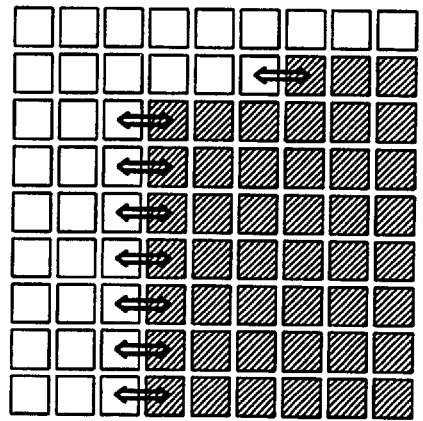

FIGS. 13(a) and 13(b) depict a scanning direction based on a direction of a boundary line on a base layer.

Figure 14:
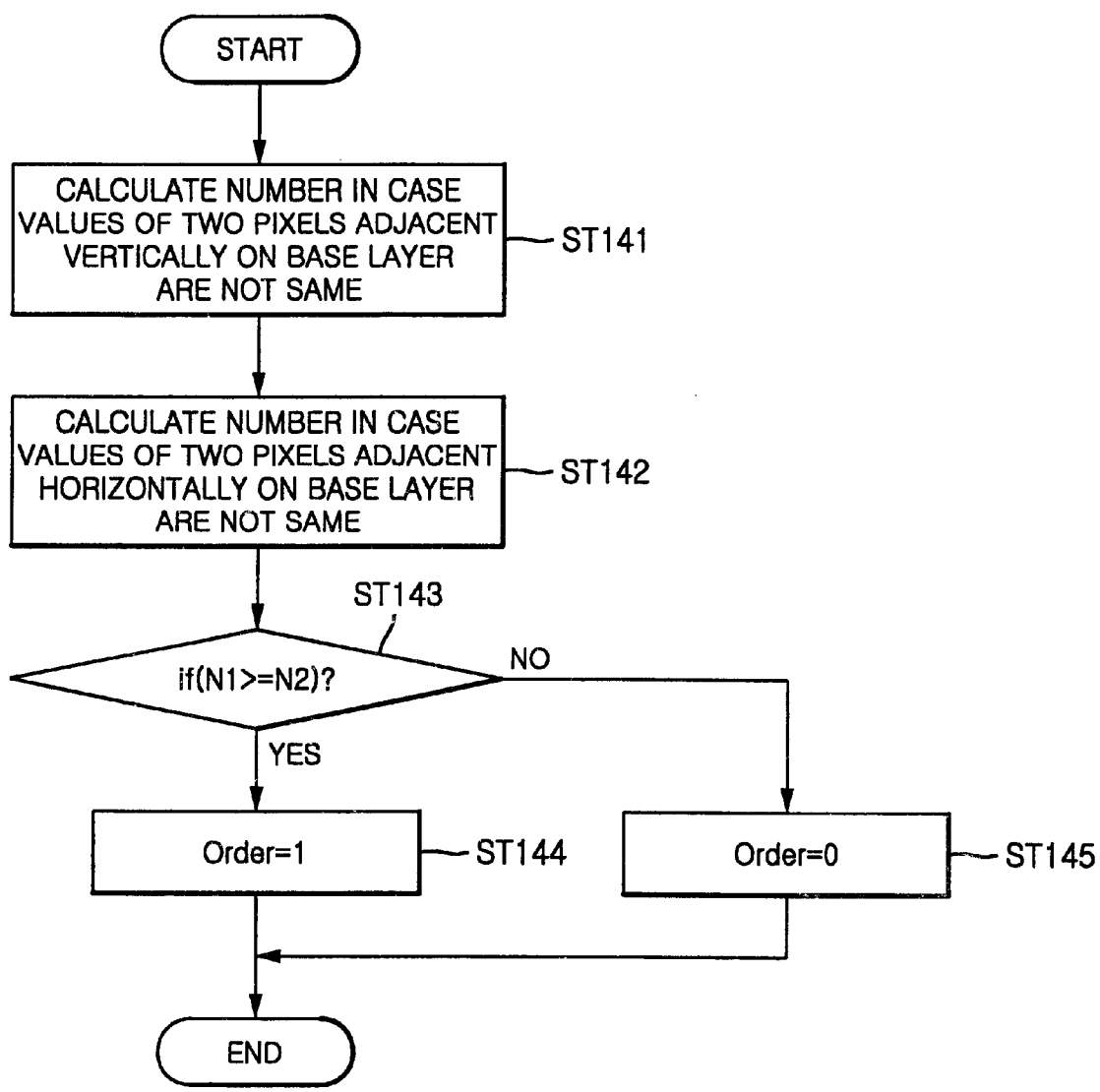

FIG. 14 sets forth a flow chart providing one embodiment of methods for deciding a scanning order in accordance with the present invention.

Figure 15:
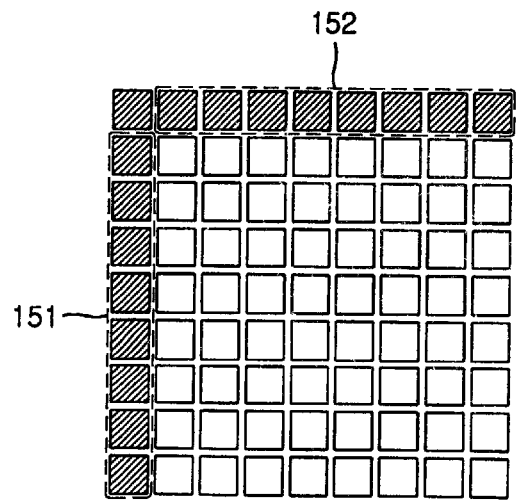

FIG. 15 provides a method for adding rows and columns of an edge on a base layer.

Figure 16:
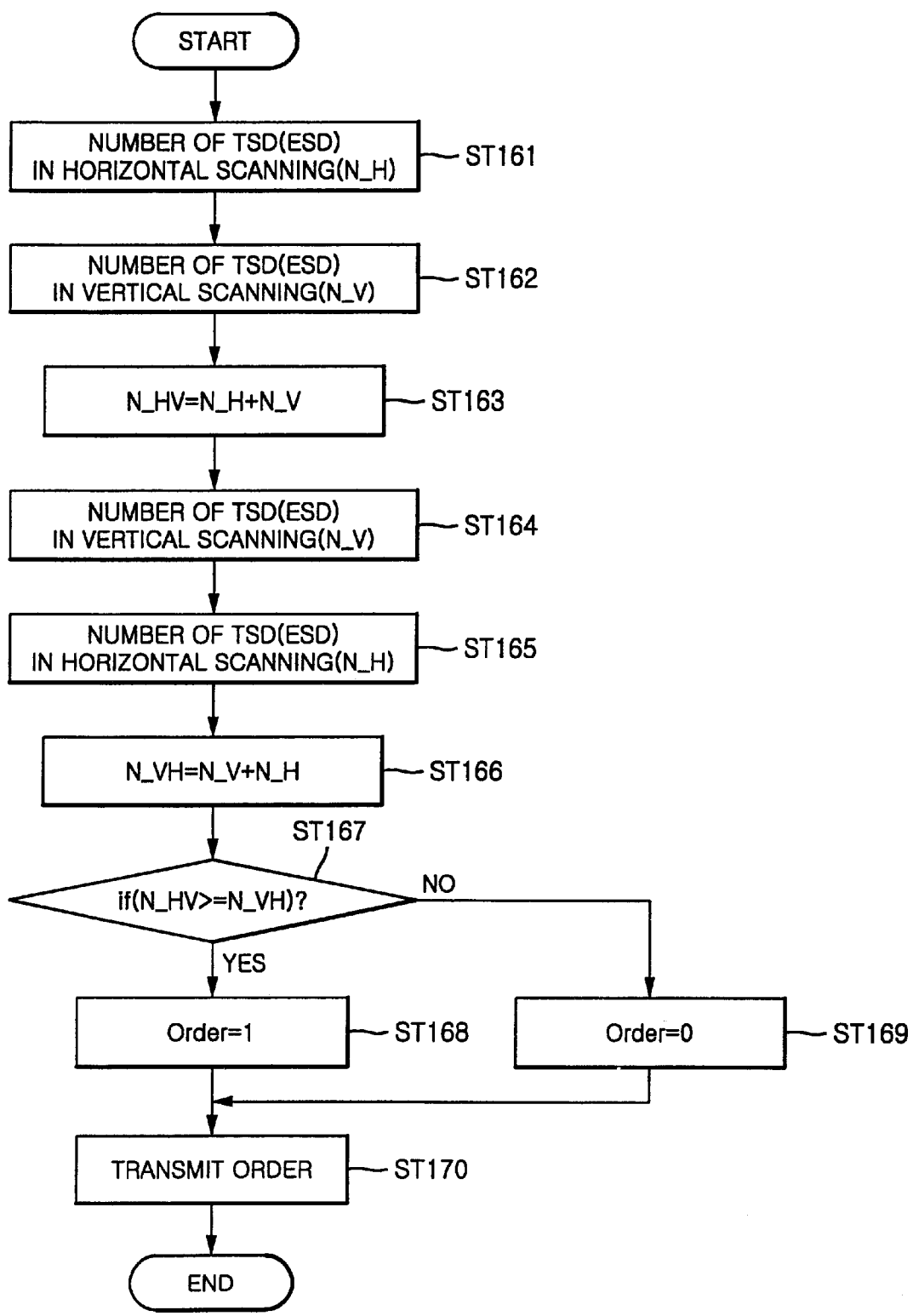

FIG. 16 presents a flow chart providing a decision of a scanning order based on the generation quantity of TSD (ESD) in the invention.

Figure 17:
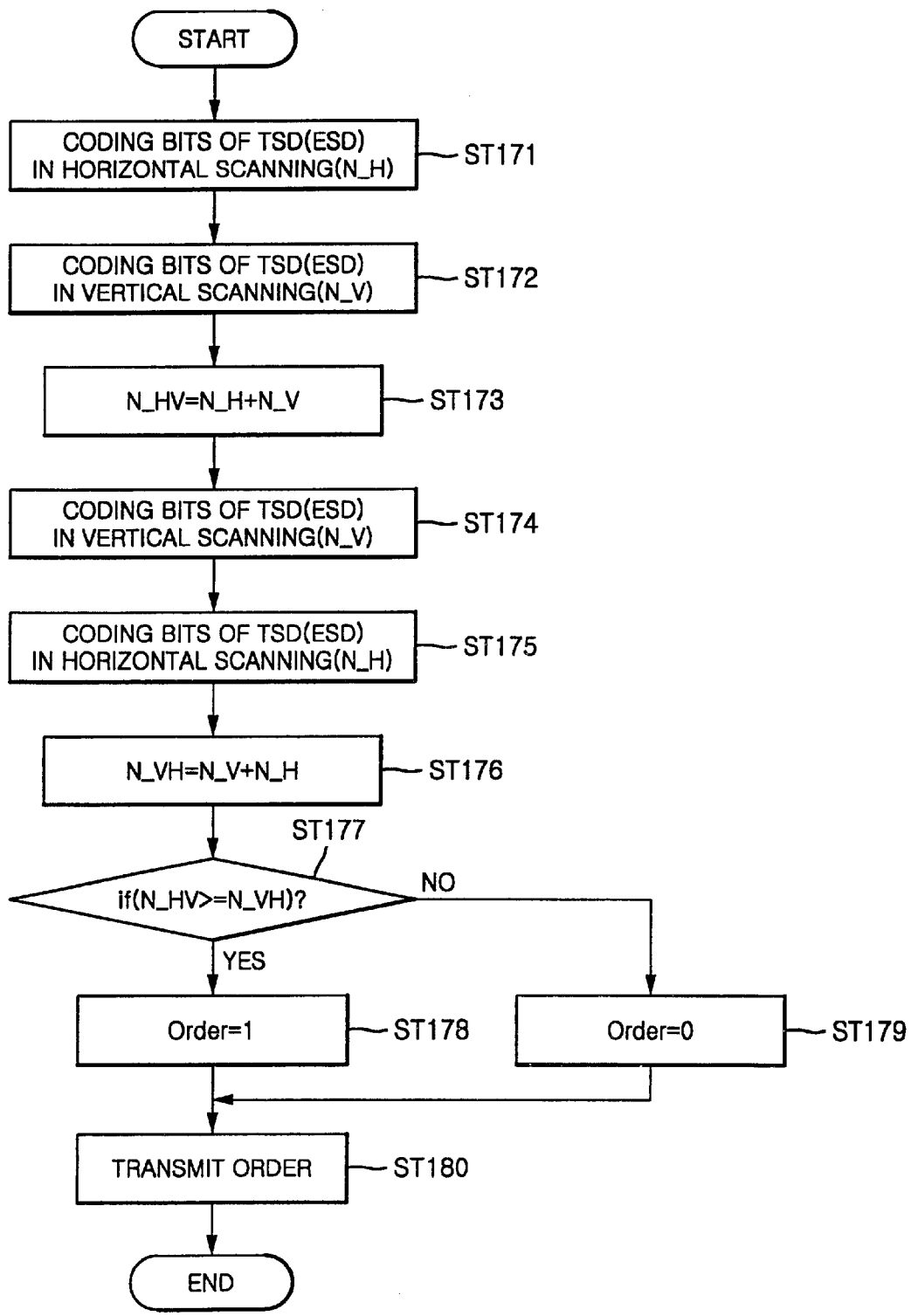

FIG. 17 illustrates a flow chart providing a decision of a scanning order based on the coded bit quantity of TSD (ESD) in the invention.

Figure 18:
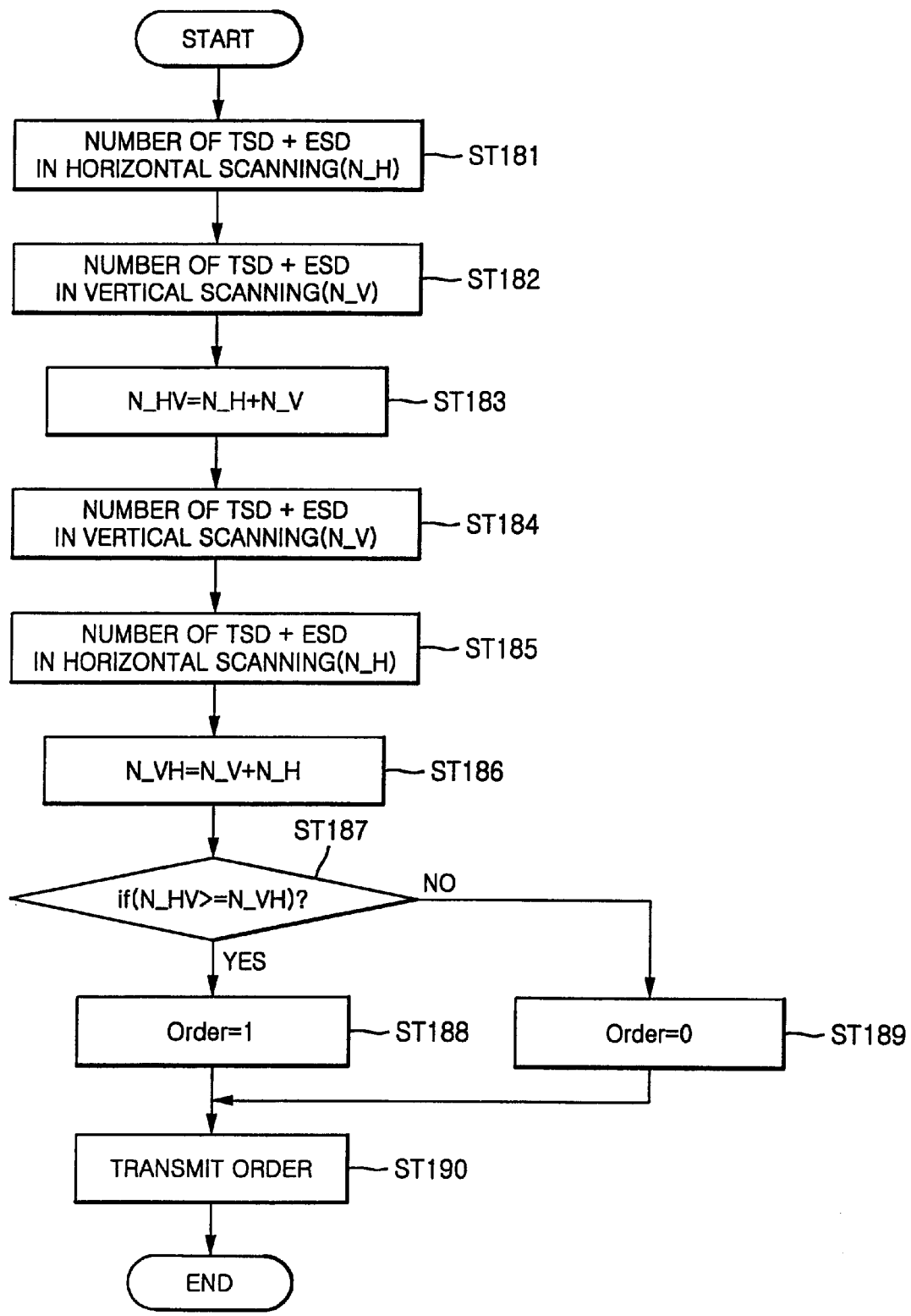

FIG. 18 is a flow chart indicating a decision for a scanning order based on the sum of the generation quantity of TSD and ESD in the invention.

Figure 19:
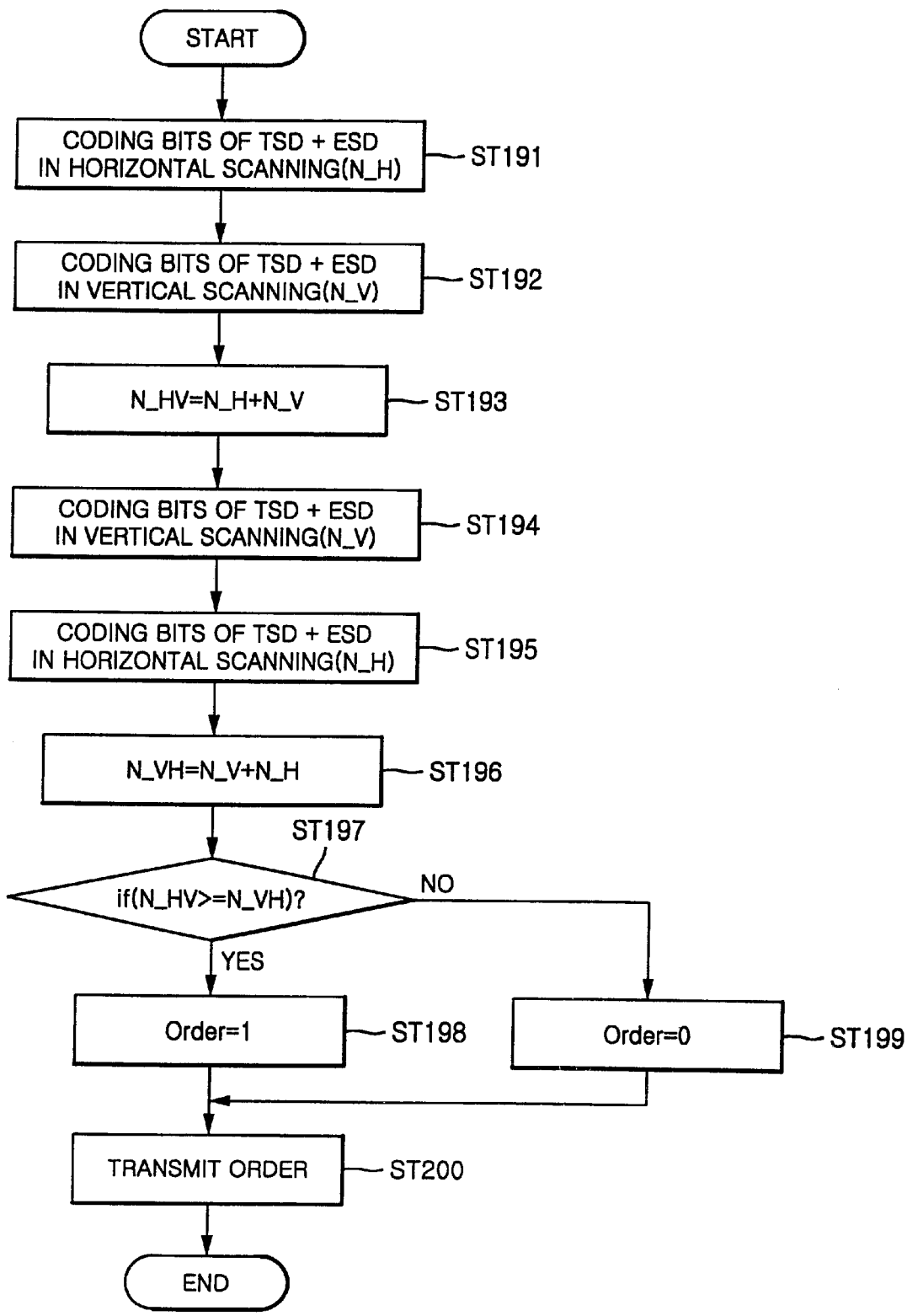

FIG. 19 shows a flow chart offering a decision for a scanning order based on the sum of the generation bits of TSD and ESD in the invention.

Figure 20:
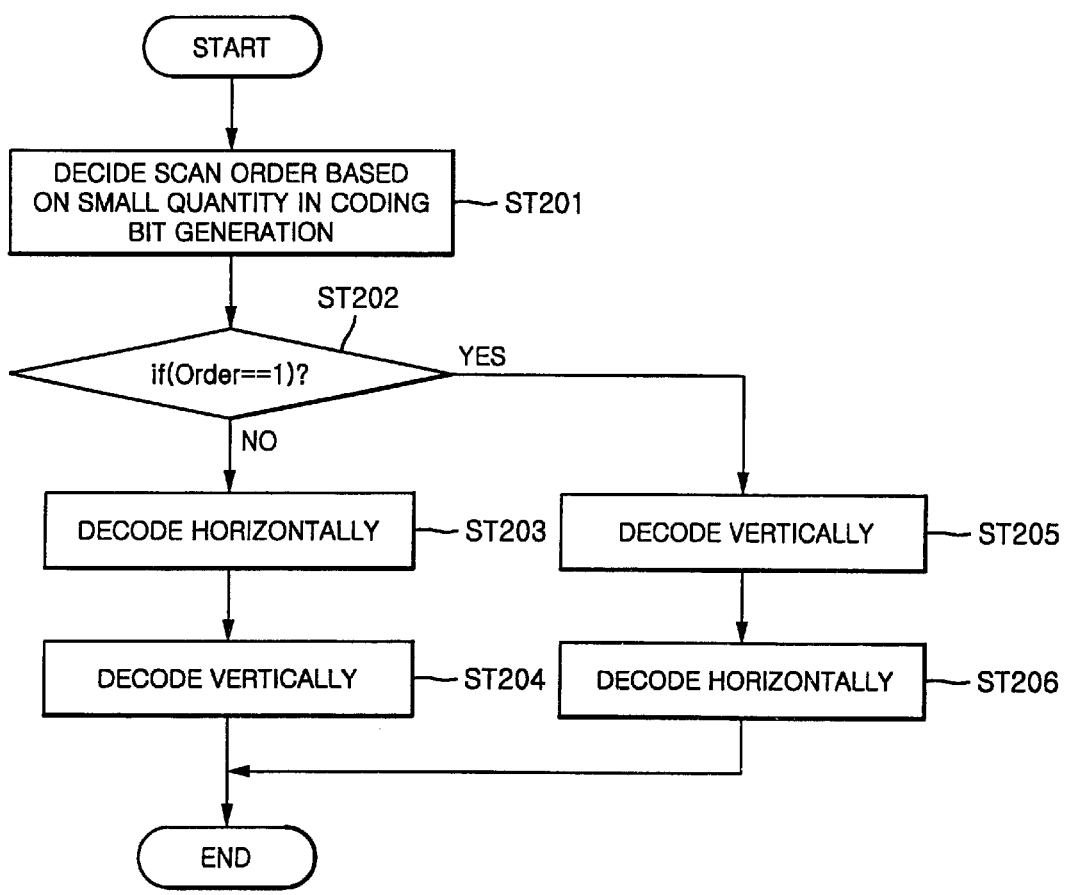

FIG. 20 sets forth a flow chart showing a method for decoding scalably shapes through an inventive scan interleaving method.

Figure 21:
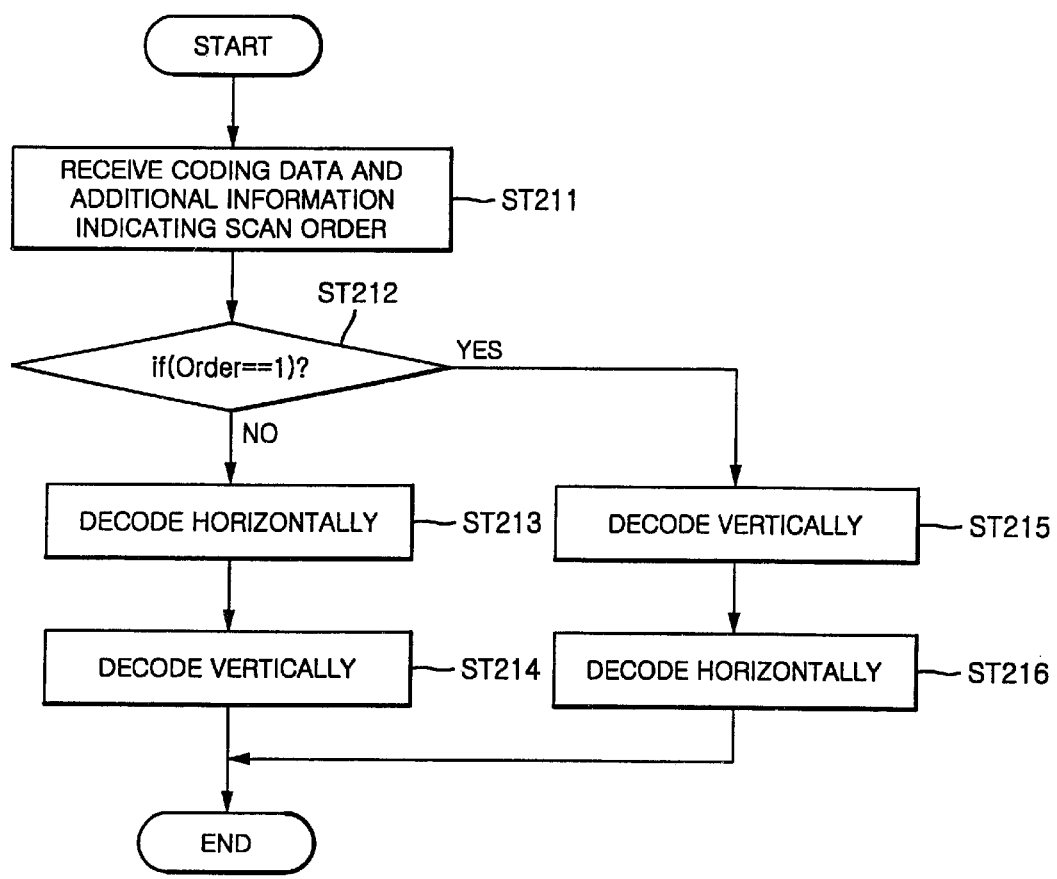

FIG. 21 represents a flow chart providing a method for decoding scalably shapes through transmitting additional information having a scanning order in the present invention.

Figure 22:
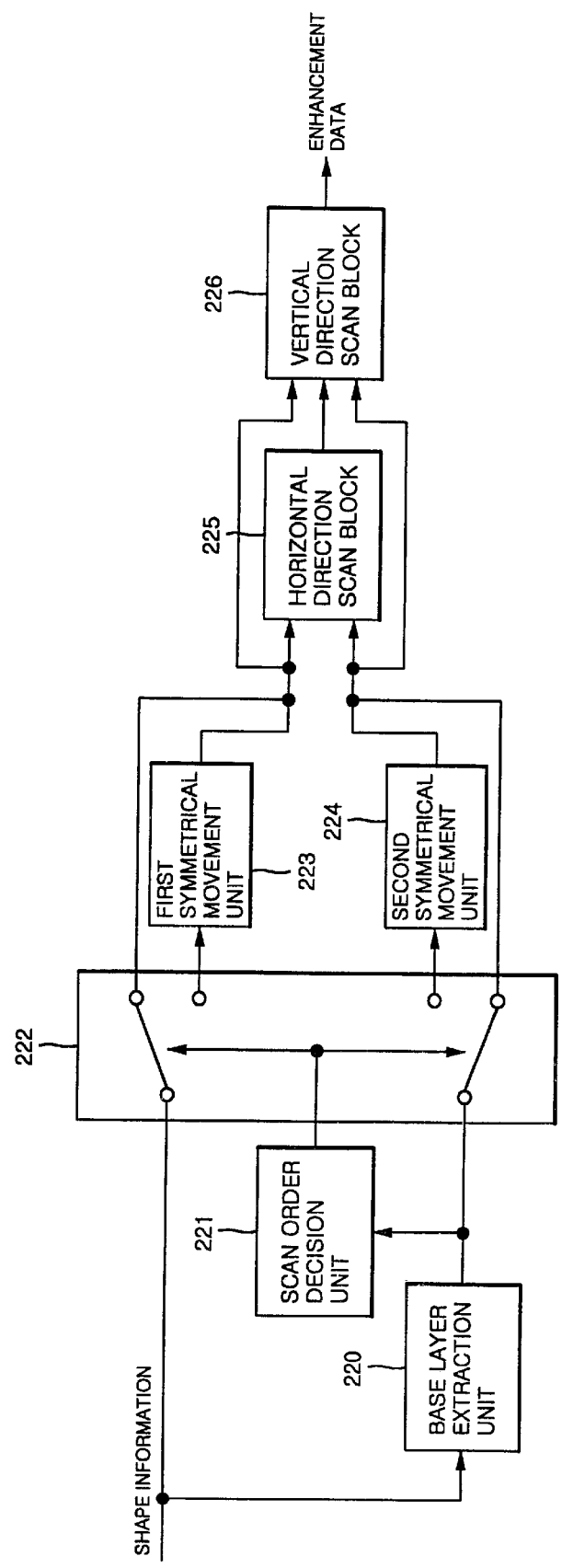

FIG. 22 presents one embodiment for an inventive encoding apparatus in which a scanning order is fixed and a scanning block is symmetrically moved.

Figure 23:
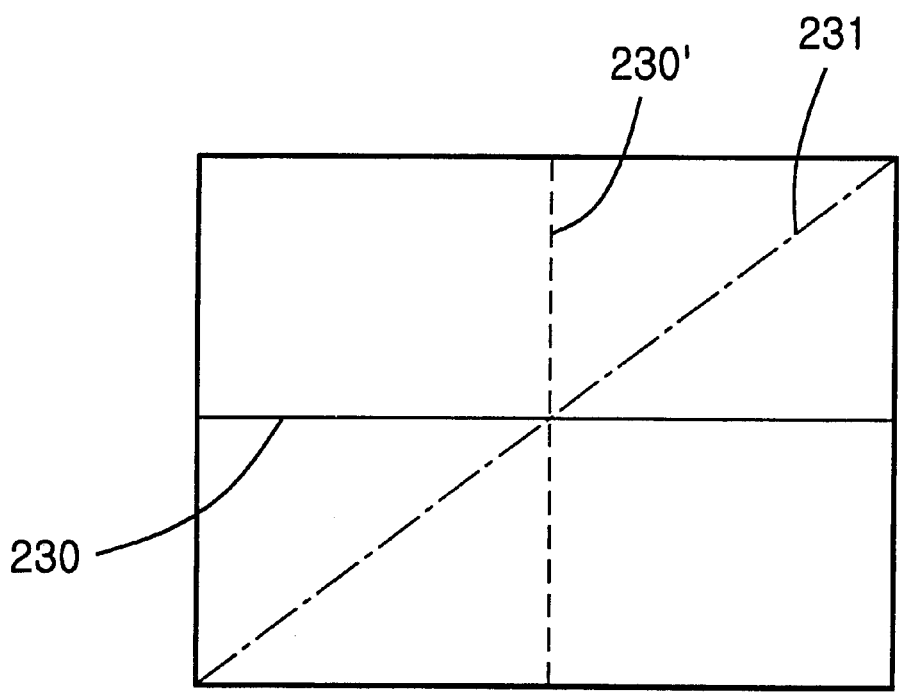

FIG. 23 is a state diagram showing that a scanning block is symmetrically moved centering on a diagonal line under a fixation of a scanning order.

Figure 24:
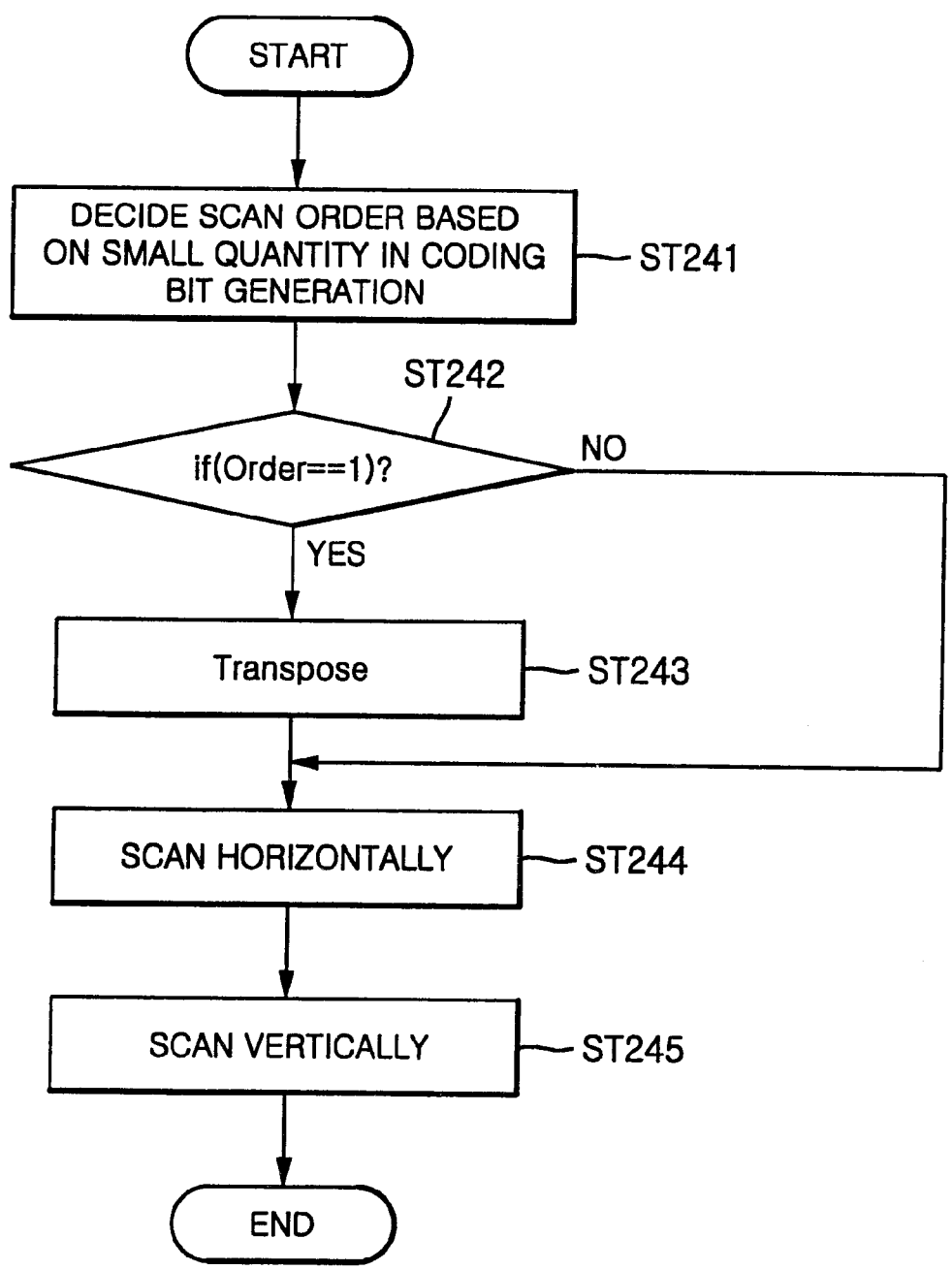

FIG. 24 illustrates a flow chart showing a scalability coding method that a scanning order is fixed and a scanning block is symmetrically moved in the present invention.

Figure 25:
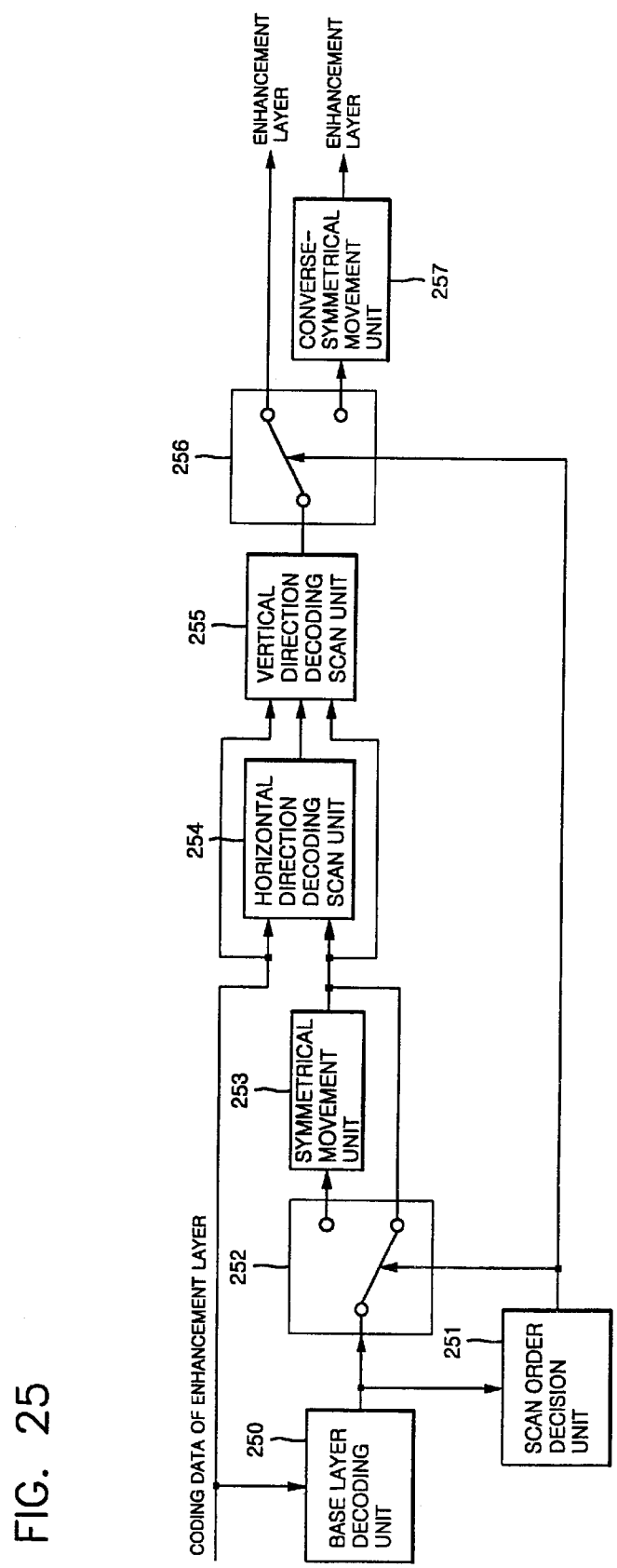

FIG. 25 indicates one embodiment for an inventive decoding apparatus in which a scanning order is fixed and a scanning block is symmetrically moved.

Figure 26:
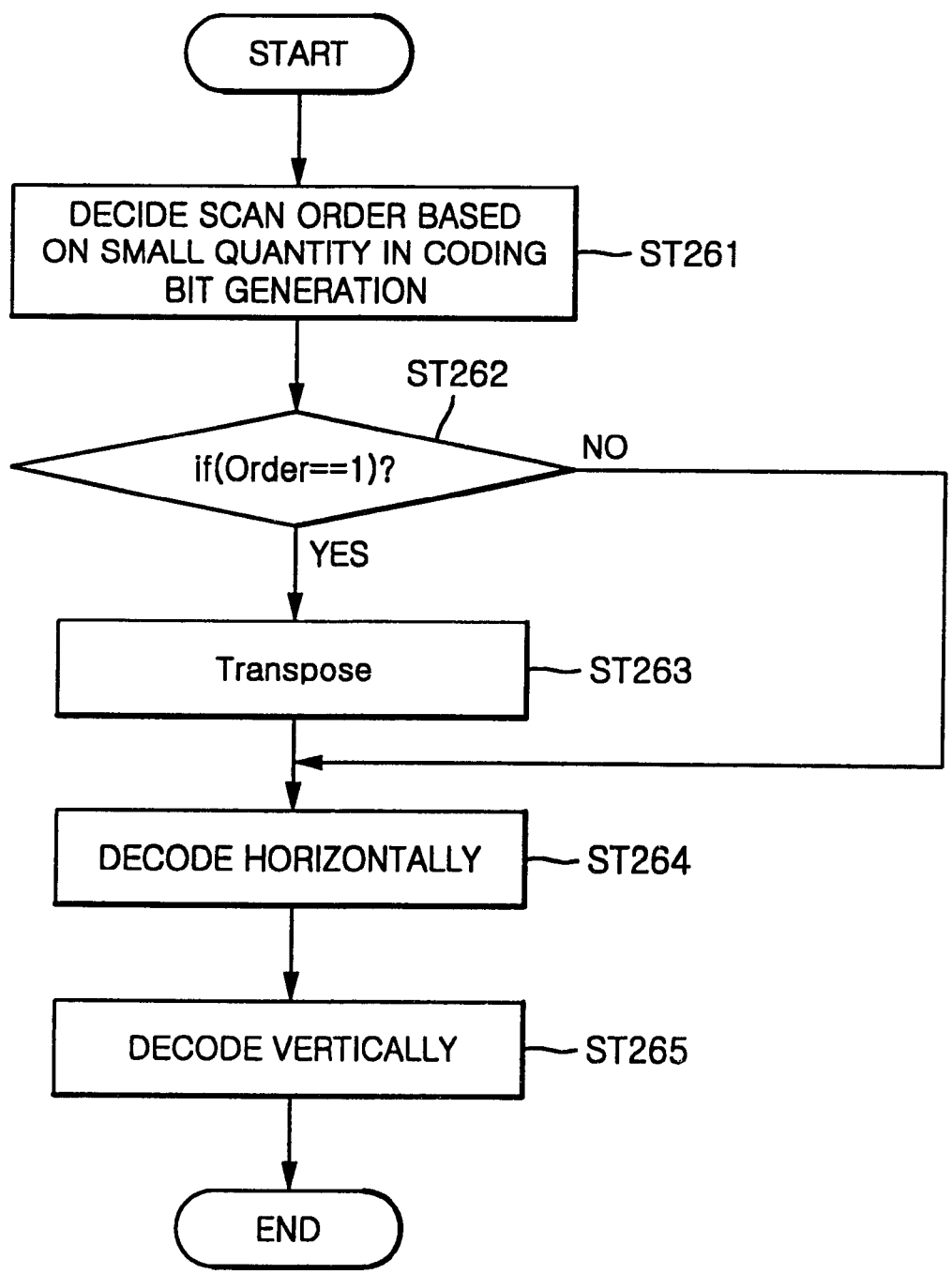

FIG. 26 is a flow chart showing a scalability decoding method that a scanning order is fixed and a scanning block is symmetrically moved in the invention.

DETAILED DESCRIPTION OF PREFERRED EMBODIMENT

Reference will now be made in detail to the preferred embodiments of the present invention, examples of which are illustrated in the accompanying drawings.

FIG. 6 shows a block diagram providing the construction of one preferred embodiment for a scan interleaving coder in accordance with the present invention.

As shown in FIG. 6, a shape information extracting unit 60 extracts shape information from an inputted image and outputs its information. A base layer extraction unit 61 extracts pixel data corresponding to a base layer from the shape information data outputted from the shape information extraction unit 60, codes the pixel data by using the existed shape information coding method, decodes the data and outputs the data. Such a process is for using data of the same base layer in a coder and decoder. A scan order decision unit 62 compares lengths of horizontal and vertical boundary lines on the base layer outputted from the base layer extraction unit 61, and outputs a switching control signal according to its comparison result. A first switching unit 63 outputs the shape information outputted from the shape information extraction unit 60 and the base layer outputted from the base layer extraction unit 61 to a first direction scan unit 64 or a second direction scan unit 65 in response to the switching control signal outputted from the scan order decision unit 62. The first direction scan unit 64 receives the base layer data and the shape information, and executes a horizontal scanning first and a vertical scanning next. The second direction scan unit 65 receives the base layer data and the shape information, and performs the vertical scanning first and the horizontal scanning next.

For the shape information, for instance, all pixel values within a frame are compared with a threshold value, then in its comparison result, pixels over the threshold value is determined as "1" and pixels under the threshold value is determined as "0". Thus a shape of a required object can be extracted from another object and a background. In such extracted shape information, one pixel per a block of a given size, for example, a block of 2×2, a block of 4×4, etc., is extracted and the base layer is made, in the base layer extraction unit 61. The scan order decision unit 62 compares lengths of the horizontal and vertical boundary lines on the base layer. Namely, the number of right or left adjacent pixels and pixels having the other value, which corresponds to a length of the vertical boundary line, is compared with the number of upper or lower adjacent pixels and pixels having the other value, which corresponds to a length of the horizontal boundary line. In its comparison result, in case that the number of right or left adjacent pixels and the pixels having the other value is larger, that is, in cast that the length of the vertical boundary line is longer than the length of the horizontal boundary line, the scan order decision unit 62 controls the first switching unit 63 so that the shape information may be inputted to the first direction scan unit 64. In its opposite case, namely, in case that the number of upper or lower adjacent pixels and the pixels having the other value is larger, the scan order decision unit 62 controls the first switching unit 63 so that the shape information may be inputted to the second direction scan unit 65.

The first direction scan unit 64 includes a horizontal direction scan block 641 and a vertical direction scan block 642 as shown in FIG. 6. The horizontal direction scan block 641 executes a horizontal direction scanning on the shape information and the base layer data and outputs the scanning completed data after its scanning completion. The vertical direction scan block 642 receives the scanning completed data from the horizontal direction scan block 641 and performs a vertical direction scanning on the shape information and the base layer data. Likewise, in the second direction scan unit 65, a scanning order from a vertical direction scan block 651 to a horizontal direction scan block 652 is only different from the scanning order from the horizontal direction scan block 641 to the vertical direction scan block 642, and its other functions are equal to them of the first direction scan unit 64.

FIG. 7 sets forth a block diagram of one preferred embodiment for an inventive horizontal direction scan unit. A coding pixel extraction unit 71 extracts coding pixels from shape information. A horizontal adjacent pixel extraction unit 72 extracts pixels positioned on the right and left of a pixel extracted by the coding pixel extraction unit 71. A first comparison unit 73 compares pixels adjacent to the coding pixel outputted from the horizontal adjacent pixel extraction unit 72, and outputs a switching control signal. A second switching unit 74 switches the coding pixel and horizontal adjacent pixels to a TSD coding unit 77 or a third switching unit 76 in response to the switching control signal. A second comparison unit 75 compares the coding pixel and its adjacent pixels, and outputs a switching control signal. A third switching unit 76 switches the coding pixel and horizontal adjacent pixels to an ESD coding unit 78 or a decoder in response to the switching control signal of the second comparison unit 75. The TSD coding unit 77 codes the coding pixel inputted through the second switching unit 74. The ESD coding unit 78 codes the coding pixel inputted through the third switching unit 76.

FIG. 8 offers a block diagram of one preferred embodiment for an inventive vertical direction scan unit. A coding pixel extraction unit 81 receives shape information and horizontal direction coding data, and extracts coding pixels from them. A vertical adjacent pixel extraction unit 82 receives the base layer data and the horizontal direction coding data outputted from the horizontal direction scan block 641 together, and extracts pixels positioned on the upper and lower sides of a pixel extracted by the coding pixel extraction unit 71. A third comparison unit 83 compares with each other vertical adjacent pixels outputted from the vertical adjacent pixel extraction unit 82, and outputs a switching control signal according to its comparison result. A fourth switching unit 84 switches the coding pixel and horizontal adjacent pixels to a TSD coding unit 87 or a fifth switching unit 86 in response to the switching control signal of the third comparison unit 83. A fourth comparison unit 85 compares the coding pixel and its adjacent pixels, and outputs a switching control signal. A fifth switching unit 86 switches the coding pixel and vertical adjacent pixels to an ESD coding unit 88 or the decoder in response to the switching control signal of the fourth comparison unit 85. The TSD coding unit 87 codes the coding pixel inputted through the fourth switching unit 84. The ESD coding unit 88 codes the coding pixel inputted through the fifth switching unit 86.

In the first scan unit 64, the horizontal direction scan block 641 is positioned ahead of the vertical direction scan block 642 as shown in FIG. 6. The shape information is inputted to the coding pixel extraction unit 71 through the first switching unit 63, wherein the shape information is enhancement layer data, and the pixels shown as parts with two sets of lines in FIG. 4 are sequentially extracted by the coding pixel extraction unit 71. The horizontal adjacent pixel extraction unit 72 receives positions of pixels extracted by the coding pixel extraction unit 71, and extracts pixels of the base layer positioned on the right and left of the coding pixel, for example, horizontal adjacent pixels 42, 44 of a coding pixel 43 in FIG. 4. At this time, in order to extract left adjacent pixels of a first column such as a pixel 41 positioned on a first column of a second row in FIG. 4(*a*), base layer pixels on a second column are copied on the left of the block, or corresponding pixels of an adjacent left block are copied. Likewise, in order to extract pixels 49 positioned on a second column of a first row in FIG. 4(*c*), base layer pixels on a second row are copied on the upper side of a block, or corresponding pixels of an adjacent upper block are copied.

The pixels 42, 44 extracted by the horizontal adjacent pixel extraction unit 72 are inputted to the first comparison unit 73 then compared therein. In case that the extracted pixels 42, 44 are not same as its comparison result, the second switching unit 74 outputs a switching control signal for connecting the coding pixel and horizontal adjacent pixels with the TSD coding unit 77 since the extracted pixels correspond to the TSD. In a same case, the extracted pixels may be the ESD, thus the second switching unit 74 outputs a switching control signal for connecting the coding pixel and horizontal adjacent pixels with the third switching unit 76.

Meantime, the coding pixel and one horizontal adjacent pixel outputted from the coding pixel extraction unit 71 and the horizontal adjacent pixel extraction unit 72 are compared with each other in the second comparison unit 75. In case that the coding pixel and one horizontal adjacent pixel are not same in the second comparison unit 75, the pixels correspond to the ESD, thus the third switching unit 76 outputs a switching control signal for connecting the coding pixel and the horizontal adjacent pixels with the ESD coding unit 78. In a same case as its comparison result, the second comparison unit 75 outputs the pixels to the vertical direction scan block 642 since the pixels do not need to be coded.

As above-mentioned, the horizontal direction scan block 641 codes pixels shown as parts with two sets of lines in FIG. 4(*a*) and outputs them to the vertical direction scan block 642. FIG. 8 presents one embodiment of the vertical direction scan block 642.

In FIG. 8, a coding pixel extraction unit 81 extracts pixels shown in parts with two sets of lines in FIG. 4(*b*) from shape information of an enhancement layer and horizontal direction coding data outputted from the horizontal direction scan block 641. A vertical adjacent pixel extraction unit 82 receives positions of pixels extracted by the coding pixel extraction unit 81, and extracts pixels positioned on the upper and lower sides of coding pixel, for example, vertical adjacent pixels 46, 47 of coding pixel 45 in FIG. 4(*b*). Likewise in this time, in order to extract pixels positioned on a first row or a first column in FIG. 4(*b*), base layer pixels on a second row or second column are copied or corresponding pixels of neighboring block are copied.

The pixels 46, 47 extracted by the vertical adjacent pixel extraction unit 72 are inputted to the first comparison unit 83 and compared with each other. In case the extracted pixels 46, 47 are not same, the pixels correspond to the TSD, thus the fourth switching unit 84 outputs a switching control signal for connecting the coding pixel and the horizontal adjacent pixels with the TSD coding unit 87. In a same case as its comparison result, the fourth switching unit 84 outputs a switching control signal for connecting the coding pixel and the horizontal adjacent pixels with the fifth switching unit 86 since the pixels may correspond to the ESD.

Meanwhile, the coding pixel and one vertical adjacent pixel outputted from the coding pixel extraction unit 81 and the vertical adjacent pixel extraction unit 82 are compared with each other in the fourth comparison unit 85. In case that the coding pixel and one vertical adjacent pixel are not same as its comparison result, the fourth comparison unit 85 is related to the ESD, thus the fifth switching unit 86 outputs a switching control signal for connecting the coding pixel and the vertical adjacent pixels with the ESD coding unit 88. In a same case as its comparison result, the pixels are outputted to the decoder since the pixels do not need to be coded.

The horizontal direction scan block 641 and vertical direction scan block 642 are included into the first scan unit 64, in which the horizontal direction scanning is first executed, and the vertical direction scanning is next performed. In the second scan unit 65, the vertical direction scan block 651 is positioned ahead of the horizontal direction scan block 652 as shown in FIG. 6. It is therefore obvious that horizontal direction coding data is not inputted to the coding pixel extraction unit 81 and the vertical adjacent pixel extraction unit 82, and the vertical direction coding data with shape information and base layer data is inputted to the coding pixel extraction unit 71 and the horizontal adjacent pixel extraction unit 72.

FIG. 9 illustrates the construction of one preferred embodiment for a scan interleaving decoder in accordance with the present invention.

A base layer decoding unit 91 receives base layer coding data transmitted from the coding apparatus and decodes the data. A scan order decision unit 92 compares lengths of horizontal and vertical boundary lines on the base layer outputted from the base layer decoding unit 91, and outputs a switching control signal according to its comparison result. A sixth switching unit 93 switches coding data transmitted from the coding apparatus and the base layer data outputted from the base layer decoding unit 91 to a first direction scan decoding unit 94 or a second direction scan decoding unit 95 in response to the switching control signal outputted from the scan order decision unit 92. The first direction scan decoding unit 94 receives the base layer data and the coding data, and executes a horizontal decoding scanning first and a vertical decoding scanning next. The second direction scan decoding unit 95 receives the base layer data and the coding data, and performs the vertical decoding scanning first and the horizontal decoding scanning next.

The base layer is coded separately from enhancement layer data, and transmitted to the decoder. The base layer decoding unit 91 receives coded base layer and decodes it. The scan order decision unit 92 compares lengths of the horizontal and vertical boundary lines on the decoded base layer. Namely, the number of right or left adjacent pixels and pixels having the other value, which corresponds to a length of the vertical boundary line, is compared with the number of upper or lower adjacent pixels and pixels having the other value, which corresponds to a length of the horizontal boundary line. In its comparison result, in case that the number of right or left adjacent pixels and the pixels having the other value is larger, that is, in cast that the length of the vertical boundary line is longer than the length of the horizontal boundary line, the scan order decision unit 92 controls the sixth switching unit 93 so that the base layer and the coding data may be inputted to the first direction scan decoding unit 94. In its opposite case, namely, in case that the number of upper or lower adjacent pixels and the pixels having the other value is larger, the scan order decision unit 92 controls the sixth switching unit 93 so that the base layer and the coding data may be inputted to the second direction scan decoding unit 95.

The first direction scan decoding unit 94 includes a horizontal direction decoding scan block 941 and a vertical direction decoding scan block 942 as shown in FIG. 9. The horizontal direction decoding scan block 941 executes a horizontal direction decoding scanning on the coding data and the base layer data and outputs the scanning completed data after its scanning completion. The vertical direction decoding scan block 942 receives the scanning completed data from the horizontal direction decoding scan block 941 and performs a vertical direction decoding scanning on the coding data and the base layer data. Likewise, in the second direction scan decoding unit 95, a scanning order from a vertical direction decoding scan block 951 to a horizontal direction decoding scan block 952 is only different from the scanning order from the horizontal direction decoding scan block 941 to the vertical direction decoding scan block 942, and its other functions are equal to them of the first direction scan decoding unit 94.

FIG. 10 represents a block diagram of one embodiment for an inventive horizontal direction decoding scan block. A horizontal adjacent pixel extraction unit 101 receives the base layer data transmitted from the base layer decoding unit 91 and extracts pixels positioned on the right and left of a pixel to be decoded. A fifth comparison unit 103 compares pixels adjacent to the decoding pixel outputted from the horizontal adjacent pixel extraction unit 101, and outputs a switching control signal. A seventh switching unit 102 switches the coding data and horizontal adjacent pixels to a TSD decoding unit 104 or an eighth switching unit 105 in response to the switching control signal of the fifth comparison unit 103. The TSD decoding unit 104 decodes the coding data inputted through the seventh switching unit 102. The eighth switching unit 105 outputs the coding data and horizontal adjacent pixels transmitted from the coding apparatus to an ESD decoding unit 106 or an adjacent pixel copy unit 107 in response to an ESD of corresponding decoding pixel among the coding data. The ESD decoding unit 106 decodes the coding pixel inputted through the eighth switching unit 105. The adjacent pixel copy unit 107 stores horizontal adjacent pixel values of decoding pixels which do not correspond to a TSD or ESD.

FIG. 11 is a block diagram of one embodiment for an inventive vertical direction decoding scan block. A vertical adjacent pixel extraction unit 111 receives horizontal direction decoding data and the base layer outputted from the horizontal direction scan block 641, and extracts pixels positioned on the upper and lower sides of decoding pixel from them. A sixth comparison unit 113 compares with one another vertical adjacent pixels outputted from the vertical adjacent pixel extraction unit 111, and outputs a switching control signal according to its comparison result. A ninth switching unit 112 switches the coding data and vertical adjacent pixels to a TSD decoding unit 114 or a tenth switching unit 115 in response to the switching control signal of the sixth comparison unit 113. The TSD decoding unit 114 decodes the coding data inputted through the ninth switching unit 112. The tenth switching unit 115 switches the vertical adjacent pixels and the coding data transmitted from the coding apparatus to an ESD decoding unit 116 or an adjacent pixel copy unit 117 according as corresponding decoding pixel among the coding data corresponds to ESD or does not correspond to the ESD. The ESD decoding unit 116 decodes the vertical adjacent pixel and coding data inputted through the tenth switching unit 115. The adjacent pixel copy unit 117 copies decoding pixels as horizontal adjacent pixel values.

In the first direction scan decoding unit 94, as shown in FIG. 9, the horizontal direction decoding scan block 941 is positioned ahead of the vertical direction decoding scan block 942. The coding data and the base layer through the sixth switching unit 93 are inputted to the horizontal direction decoding scan block 941, wherein the coding data is data which the enhancement layer was coded. The horizontal adjacent pixel extraction unit 101 extracts horizontal adjacent pixels, 42, 44 in FIG. 4(a) of decoding pixel, for example, a pixel 43 on a second row and third column in FIG. 4(a), sequentially by pixels of the base layer outputted from the base layer decoding unit 91.

At this time, in order to decode pixels on a first column, such as a pixel 41 on the second row and first column in FIG. 4(a), base layer pixels on a second column are copied on the left of a block and then used. The pixels 42, 44 extracted by the horizontal adjacent pixel extraction unit 101 are inputted to the fifth comparison unit 103 and compared with each other. In case the extracted pixels 42, 44 are not same, the pixels correspond to the TSD, thus the fifth comparison unit 103 controls so that the seventh switching unit 102 may switch the coding data and horizontal adjacent pixels to the TSD decoding unit 104. In a same case, also, the pixels are available to be the ESD, thus the seventh switching unit 102 outputs a control signal for connecting the coding data and horizontal adjacent pixels with the eighth switching unit 105.

Meantime, in case that corresponding decoding pixel among the coding data belongs to the ESD, the eighth switching unit 105 is controlled by the ESD so that the coding data and horizontal adjacent pixel transmitted from the coding apparatus may be switched to the ESD decoding unit 106. In case that the corresponding decoding pixel does not belong to the ESD, the pixel does not need to be coded, thus the pixel is outputted to the adjacent pixel copy unit 107.

As above-mentioned, the horizontal direction decoding scan block 941 decodes pixels shown as parts with two sets of lines in FIG. 4(a) and outputs them to the vertical direction decoding scan block 942. The vertical adjacent pixel extraction unit 111 extracts vertical adjacent pixels, 49, 50 in FIG. 4(c) of decoding pixel, for example, a pixel 48 on a second row and second column in FIG. 4(c), sequentially by pixels of the base layer and horizontal direction decoding data outputted from the horizontal direction decoding scan block 941. At this time, in order to decode pixels on a first row of an enhancement layer, the vertical adjacent pixel extraction unit 111 decodes the pixels by using a pixel value on a corresponding position of its neighboring block or doubly using the first row of the base layer.

The pixels 49, 50 extracted by the vertical adjacent pixel extraction unit 111 are inputted to the sixth comparison unit 113 and compared with each other. In case the extracted pixels 49, 50 are not same, the pixels correspond to the TSD, thus the ninth switching unit 112 outputs a switching control signal for connecting the coding data and the vertical adjacent pixels 49, 50 with the TSD decoding unit 114. In a same case as its comparison result, the ninth switching unit 112 outputs a switching control signal for connecting the coding data and the vertical adjacent pixels 49, 50 with the tenth switching unit 115 since the pixels may correspond to the ESD.

Meanwhile, in case that corresponding decoding pixel among the coding data belongs to the ESD, the tenth switching unit 115 is controlled by the ESD so that the coding data and vertical adjacent pixel transmitted from the coding apparatus may be switched to the ESD decoding unit 116. In case that the corresponding decoding pixel does not belong to the ESD, the pixel does not need to be coded, thus the pixel is outputted to the adjacent pixel copy unit 117.

The horizontal direction decoding scan block 941 and vertical direction decoding scan block 942 are included into the first direction scan decoding unit 94, in which the horizontal direction scanning is first executed, and the vertical direction scanning is next performed. In the second direction scan decoding unit 95, the vertical direction decoding scan block 951 is positioned ahead of the horizontal direction decoding scan block 952 as shown in FIG. 9.

FIG. 12 presents a flow chart showing a scalable shape information coding method through a use of a scan interleaving. In a step ST121, in case the scan interleaving method is utilized in order to execute a scalable coding on shape information, a scan order for generating coding bits in the small quantity is decided, since the generation quantity of coding bits is different according to a scan order of horizontal and vertical directions. In a step ST122, it is detected whether or not a flag, Order, indicating a scan order decided in the step ST121 represents a value for preferentially executing a vertical scanning, namely, Order=1. In a case of a priority order of the vertical scanning, the vertical scanning is executed in a step ST125 and a horizontal scanning is performed in a step ST126. In a case of a priority order of a horizontal scanning, the horizontal scanning is executed in a step ST123 and a vertical scanning is performed in a step ST124.

In a way for deciding a scan order, as shown in FIGS. 13(a) and 13(b), the number of pixels constituting a horizontal boundary line and pixels constituting a vertical boundary line on the base layer is compared, and a direction having larger value as its comparison result is decided to be scanned first. For instance, when a scanning is horizontally executed as shown in FIG. 13(b), 8 pixels having values different from one another are generated, and when a vertical scanning is done as shown in FIG. 13(a), 6 pixels having other values are generated. Namely, since the number of pixels having other values is more on a horizontal direction, a possibility for a TSD generation is higher on the horizontal direction when an enhancement layer is coded. In this case, accordingly, the total generation number of TSDs can be lessened by executing a horizontal scanning first and a vertical scanning next. Since a coder and a decoder include the same base layer and the decoder can thus know a scan direction by the same method, a decoding can be done without a transmission of additional information having a scan direction.

FIG. 14 is a flow chart presenting one embodiment of a method for deciding a scan order, in which coding bits can be generated in a small quantity. In a step ST141, a base layer is extracted from shape information, and the number of pixels adjacent vertically on the base layer, which have other values, is calculated, the number being as N1 corresponding to a length of a horizontal boundary line. In a step ST142, the number of pixels adjacent horizontally on the base layer, which have other values, is calculated, the number being as N2 corresponding to a length of a vertical boundary line. In a step 143, it is detected whether or not the number of pixels adjacent vertically, which have other values, namely, N1 is larger than the number of pixels adjacent horizontally, which have other values, namely, N2. In a case of N1>N2, in a step ST144, a value of a flag, Order, indicating a scan order, is determined as "1". In a case except N1>N2, in a step ST145, a value of a flag, Order, indicating a scan order, is determined as "0". When the scan order is decided, the scanning is executed according to the decided order as shown in FIGS. 12. Like this, in case the scan order is decided by lengths of vertical and horizontal boundary lines on the base layer, coding data on the base layer is transmitted to the decoder, and the decoder decodes the base layer, to thereby compare lengths of the vertical and horizontal boundary lines and then be able to know a scan order decided in the coder. Therefore, there is no need to transmit additional information indicating a scan order to the decoder. In case an enhancement layer is coded by using a base layer, a horizontal scanning is not available to be done in a coding a first column of the enhancement layer since pixels of a base layer to be referred are positioned only on the right side as shown in FIGS. 4(a) and 4(c). In such a case, therefore, as shown in FIG. 15, a first column of the most right of a left block, 151, is used. If there is no the left block, a first column of the base layer is copied on the left of a first column on the enhancement layer and then the horizontal scanning is done by the scan interleaving method.

In coding a first row of the enhancement layer, a vertical scanning is not available to be done since pixels of the base layer to be referred are positioned only on the lower side as shown in FIG. 4(c). In this case, thus, as shown in FIG. 15, a first row 152 of the lowest side of an upper block is used. If there is no the upper block, a first row of the base layer is copied on an upper side of a first row on the enhancement layer and then a vertical scanning is done by the scan interleaving method. In order to code from the base layer to the enhancement layer, in a case of using the scan interleaving, two kinds of data, TSD and ESD, should be coded. A scan order which the TSD and ESD can be a little generated should be decided since the generation quantity of TSD and ESD may become different according to the scan order.

FIG. 16 provides a flow chart setting forth a method for deciding a scan order based on a generation quantity of TSD and ESD in the invention. In a step ST161, a VOP (video object plane) or a block of a given size, e.g., 4×4, 2×2, etc., is extracted from shape information and the number of TSDs(ESDs) in the horizontal scanning, N_H, is calculated, wherein the VOP is selected from the MPEG-4 and a polygonal domain for coding in an object unit. In a step ST162, the coding number of TSDs (ESDs), N_V, for the VOP or the block of a given size in the vertical scanning is computed. In a step ST163, the N_H and N_V are added up and the number of the total TSDs (ESDs) generated in the horizontal preferential scan order, N_HV, is counted. In a step ST164, the VOP or a block of a given size is extracted from the shape information, and the number of TSDs(ESDs) in the vertical scanning, N_V, is calculated. In a step ST165, the coding number of TSDs (ESDs) in the horizontal scanning, for the VOP or the block of a given size, N_H, is computed. In a step ST166, the N_H and N_V are added up and the number of the total TSDs (ESDs) generated in the vertical preferential scan order, N_VH, is counted.

In a step 167, it is detected whether or not it is N_HV>N_VH. In a case of N_HV>N_VH, in a step ST168, the flag(Order) indicating the scan order is determined as "1", to thereby represent a priority order of the vertical (horizontal) scanning. In case it is not N_HV>N_VH, in a step ST169, the flag(order) indicating the scan order is determined as "0", to thereby represent a priority order of the horizontal (vertical) scanning. In a step ST170, the additional information indicating the scan order, e.g., flag(Order) data, should be transmitted to the decoder since the decoder does not know the scan order when the scan order is decided then the coding is executed. The decoder receives the additional information and decodes the base layer to the enhancement layer according to its scan order.

Herewith, the additional information may be represented by fixed length coding, variable length coding, fixed arithmetic coding and variable arithmetic coding methods. The quantity of information generated in coding the TSD and ESD becomes different according to coding methods, therefore, the quantity of information does not always becomes much when the generation quantity of TSD is much, the quantity of information does not always becomes much when the generation quantity of ESD is much. Also, actually coding the TSD and ESD and comparing its generating information quantity can be more exact, since as afore-mentioned the quantity of coding information for respective TSD and ESD is different from each other. Accordingly, differently from the above scan order deciding method, in case the horizontal scanning is executed first and the vertical scanning is executed next, the TSD (ESD) generated in such a case is coded. The number of bits generated in such a coding is compared with the number of bits gotten in coding the TSD (ESD) generated in case that the vertical scanning is executed first and the horizontal scanning is executed next. As its comparison result the case that the number of coding bits on the TSD (ESD) is gotten in the small quantity, can be decided as the scan order.

FIG. 17 shows a flow chart setting forth a method for deciding a scan order based on the coding bit quantity of TSD and ESD in the invention. In a step ST171, a VOP or a block of a given size is extracted from the shape information and the coding bit number of TSDs(ESDs) in the horizontal scanning, N_H, is calculated. In a step ST172, the coding bit number of TSDs (ESDs), N_V, for the VOP or the block of a given size in the vertical scanning is computed. In a step ST173, the N_H and N_V are added up and the coding bit number of the total TSDs (ESDs) generated in the horizontal preferential scan order, N_HV, is counted. In a step ST174, the VOP or the block of a given size is extracted from the shape information, and the coding bit number of TSDs (ESDs) in the vertical scanning, N_V, is calculated. In a step ST175, the coding bit number of TSDs (ESDs) in the horizontal scanning, N_H, is computed. In a step ST176, the N_H and N_V are added up and the coding bits of the total TSDs (ESDs) generated in the vertical preferential scan order, N_VH, is counted.

In a step 177, it is detected whether or not it is N_HV>N_VH. In a case of N_HV>N_VH, in a step ST178, the flag(Order) indicating the scan order is determined as "1", to thereby represent a priority order of the vertical (horizontal) scanning. In case it is not N_HV>N_VH, in a step ST179, the flag(Order) indicating the scan order is determined as "0", to thereby represent a priority order of the horizontal (vertical) scanning. In a step ST180, the flag(Order) indicating the scan order is transmitted to the decoder. Also, differently from the above scan order deciding method, the sum of TSD and ESD gotten in executing the horizontal scanning is compared with the sum of TSD and ESD gotten in executing the vertical scanning. As its comparison result, a scanning for a direction that the sum of TSD and ESD is larger, may be performed first.

FIG. 18 offers a flow chart providing a method for deciding a scan order based on the generation quantity sum of TSD and ESD in the invention. In a step ST181, a VOP or a block of a given size is extracted from shape information and the sum of TSD and ESD in the horizontal scanning, N_H, is calculated. In a step ST182, the sum of TSD and ESD in the vertical scanning, N_V, is computed. In a step ST183, the N_H and N_V are added up and the number of the total TSD and ESD generated in the horizontal preferential scan order, N_HV, is counted. In a step ST184, the sum of TSD and ESD in the vertical scanning, N_V, is calculated. In a step ST185, the sum of TSD and ESD in the horizontal scanning, N_H, is computed. In a step ST186, the N_H and N_V are added up and the sum of the total TSD and ESD generated in the vertical preferential scan order, N_VH, is counted.

In a step 187, it is detected whether or not it is N_HV>N_VH. In a case of N_HV>N_VH, in a step ST188, the flag(Order) indicating the scan order is determined as "1", to thereby represent a priority order of the vertical (horizontal) scanning. In case it is not N_HV>N_VH, in a step ST189, the flag(Order) indicating the scan order is determined as "0", to thereby represent a priority order of the horizontal (vertical) scanning. In a step ST190, the flag(Order) indicating the scan order is transmitted to the decoder.

Also, actually coding the TSD and ESD and comparing its generating information quantity can be more exact, since as afore-mentioned the quantity of coding information for respective TSD and ESD is different from each other. Accordingly, differently from the above scan order deciding method, in case the horizontal scanning is executed first and the vertical scanning is executed next, the TSD and ESD generated in such a case are coded. The number of bits generated in such a coding is compared with the number of bits gotten in coding the TSD and ESD generated in case that the vertical scanning is executed first and the horizontal scanning is executed next. As its comparison result the case that the number of coding bits on the TSD and ESD is gotten in the small quantity, may be decided as the scan order.

FIG. 19 illustrates a flow chart providing a method for deciding a scan order based on the generation bit sum of TSD and ESD in the invention. In a step ST191, a VOP or a block of a given size is extracted from shape information and the bit sum gotten in coding TSD and ESD in the horizontal scanning, N_H, is calculated. In a step ST192, the bit sum gotten in coding TSD and ESD in the vertical scanning, N_V, is computed. In a step ST193, the N_H and N_V are added up and the bit sum generated in coding the total TSD and ESD in the horizontal preferential scan order, N_HV, is counted. In a step ST194, the bit sum gotten in coding the TSD and ESD in the vertical scanning, N_V, is calculated. In a step ST195, the sum of TSD and ESD in the horizontal scanning, N_H, is computed. In a step ST196, the N_H and N_V are added up and the bit sum gotten in coding the total TSD and ESD generated in the vertical preferential scan order, N_VH, is counted.

In a step 197, it is detected whether or not it is N_HV>N_VH. In a case of N_HV>N_VH, in a step ST198, the flag(Order) indicating the scan order is determined as "1", to thereby represent a priority order of the vertical (horizontal) scanning. In case it is not N_HV>N_VH, in a step ST199, the flag(Order) indicating the scan order is determined as "0", to thereby represent a priority order of the horizontal (vertical) scanning. In a step ST200, the flag(Order) indicating the scan order is transmitted to the decoder.

FIG. 20 presents a flow chart showing a scalable shape information decoding method through a use of a scan interleaving. In a step ST201, in case the scan interleaving method is utilized in order to execute a scalable coding on shape information, a decoding apparatus can not know a scan order of vertical and horizontal scannings in coding. Thus, in the decoding apparatus equally to the coding apparatus, lengths of horizontal and vertical boundary lines on the base layer are compared, and the scan order is decided. In a step ST202, it is detected whether or not a flag, Order, indicating the scan order decided in the step ST201 represents a value for preferentially executing the vertical scanning, namely, Order=1. In a case of a priority order of the vertical scanning, the vertical decoding scanning is executed in a step ST205 and a horizontal decoding scanning is performed in a step ST206. In a case of a priority order of a horizontal scanning, the horizontal decoding scanning is executed in a step ST203 and the vertical decoding scanning is performed in a step ST204. In case the scan order is decided by detecting the generation quantity of TSD and ESD according to the scan order, the scan order decided in the coding apparatus should be transmitted to the decoding apparatus as the additional information.

FIG. 21 depicts a flow chart showing a scalable shape information decoding method in which additional information indicating a scan order is transmitted, in accordance with the present invention. In a step ST211, receives coding data, coding base layer and the additional information. In a step ST212, it is detected whether or not a flag, Order, indicating the additional information represents a value for preferentially executing the vertical scanning, namely, Order=1. In a case of a priority order of the vertical decoding scanning, the vertical decoding scanning is executed in a step ST215 and a horizontal decoding scanning is performed in a step ST216. In a case of a priority order of a horizontal scanning, the horizontal decoding scanning is executed in a step ST213 and the vertical decoding scanning is performed in a step ST214. Also, when the scan order of vertical and horizontal scannings is decided, the scan direction is fixed, e.g., the horizontal direction first and the vertical direction next or the vertical direction first and the horizontal direction next, instead of changing the scan direction for the sake of a sequential scan in an actual scanning; and then, a block to be scanned is moved in the right and left symmetrical way centering on a diagonal line, or is rotated 90 degrees, in order for the scanning.

FIG. 22 provides one embodiment of a coding apparatus in which a scan order is fixed and a scanning block is symmetrically moved, in the invention. This embodiment is for the scan order that the horizontal scanning is performed first and the vertical scanning is executed next, but a case of a scan order such as the vertical scanning first and the horizontal scanning next, may have the same description, as follows.

A scan order decision unit 221 compares lengths of horizontal and vertical boundary lines on the base layer, and outputs a switching control signal according to its comparison result. A switching unit 222 switches an enhancement layer and the base layer to first and second symmetrical movement units 223, 224 in response to the switching control signal outputted from the scan order decision unit 221. A horizontal direction scan unit 225 and a vertical direction scan unit 226 scan the enhancement layer and the base layer horizontally and vertically. The scan order decision unit 221 compares lengths of the horizontal and vertical boundary lines on the base layer. In case the horizontal boundary line is longer than the horizontal boundary line, a preferential vertical scanning generates coding bits in smaller quantity, thus the scan order decision unit 221 controls the switching units 222 to switch the enhancement layer and the base layer to the first and second symmetrical movement units 223, 224. The first and second symmetrical movement units 223, 224 moves symmetrically the enhancement layer and the base layer centering on a diagonal line, and outputs it. In case the scan order is fixed as the horizontal scanning first and the vertical scanning next, when the horizontal boundary line 230 is symmetrically moved centering on the diagonal line 231 as shown in FIG. 23, the horizontal boundary line 230 is converted into the vertical boundary line 230'. That is, the generation quantity of coding bits can be reduced as afore-mentioned. The same description is also available in case the scan order is fixed as the vertical scanning first and the horizontal scanning next. Accordingly, when the enhancement layer and the base layer are symmetrically moved, it is converted the horizontal boundary line into the vertical boundary line and the vertical boundary line into the horizontal boundary line. Even though the horizontal scanning first and the vertical scanning next are executed under a state that the vertical boundary line is longer than the horizontal boundary line, the scanning is done in a direction which the coding bits can be generated in less quantity without a change of a hardware.

FIG. 24 shows a flow chart providing a scalable coding method in which a scan order is fixed and a scanning block is symmetrically moved, in the invention. In a step ST241, it is constructed that a scan order is predetermined, the coding apparatus and the decoding apparatus perform the coding/the decoding by the predetermined scan order, e.g., the horizontal scanning first and the vertical scanning next, and data indicating the scan order, e.g., determining as "1", is determined. In afore-mentioned scan order deciding methods, it is detected what scan order can be used in order for a coding bit generation of small quantity, e.g., methods for deciding lengths of horizontal and vertical boundary lines on the base layer and deciding by additional information transmitted from the coding apparatus. In a step ST242, it is detected whether or not the decided scan order for the coding bit generation of small quantity is the fixation scan order. In a case of the fixation scan order, in a step ST244, the horizontal scanning is first performed in the fixed scan order, and in a step ST245 the vertical scanning is done next. In case that it is not the fixation scan order, the block is rotated 90 degrees in a step ST243, and the horizontal and vertical scannings are done.

FIG. 25 represents one embodiment of a decoding apparatus in which a scan order is fixed and a scanning block is symmetrically moved, in the invention. This embodiment is for the scan order that the horizontal scanning is performed first and the vertical scanning is executed next, but a case of a scan order such as the vertical scanning first and the horizontal scanning next, may have the same description, as follows.

A base layer decoding unit 250 decodes a base layer in coding data transmitted from the coding apparatus. A scan order decision unit 251 compares lengths of horizontal and vertical boundary lines on the base layer, and outputs a switching control signal according to its comparison result. A switching unit 252 switches the base layer to a symmetrical movement unit 253 in response to the switching control signal outputted from the scan order decision unit 251. The symmetrical movement unit 253 symmetrically moves the base layer outputted through the switching unit 252 centering on a diagonal line or rotates it 90 degrees and outputs it. A horizontal direction decoding scan unit 254 and a vertical direction decoding scan unit 255 scan the base layer outputted through the symmetrical movement unit 253 or not through it, horizontally and vertically. A second switching unit 256 switches the enhancement layer outputted from the vertical direction decoding scan unit 255 to a converse symmetrical movement unit 257 in response to the switching control signal of the scan order decision unit 251. The converse symmetrical movement unit 257 symmetrically moves the enhancement layer inputted through the second switching unit 256 in an opposite direction to a direction of the symmetrical movement unit 253, or rotates the enhancement layer 90 degrees, to thereby generate and output an original enhancement layer which is not moved symmetrically.

The scan order decision unit 251 compares lengths of the horizontal and vertical boundary lines on the base layer. In case the horizontal boundary line is longer than the vertical boundary line, coding data transmitted from a transmission side is coded in a preferential vertical scanning, thus the scan order decision unit 251 controls the switching units 252 to switch the base layer to the symmetrical movement unit 253. Such symmetrical movement of the base layer has reasons that the base layer is transmitted without a symmetrical movement in coding and the enhancement layer is coded after the symmetrical movement and then transmitted.

The symmetrical movement unit 253 moves symmetrically the base layer like the coding side and outputs it. In case the vertical boundary line is longer than the horizontal boundary line, coding data is coded in a preferential horizontal scanning, thus the scan order decision unit 251 controls the switching units 252 to switch the base layer to the horizontal direction decoding scan unit 254 and the vertical direction decoding scan unit 255, not through the first symmetrical movement unit 253. The symmetrical movement unit 253 moves symmetrically the base layer centering on the diagonal line and output it as afore-mentioned. The horizontal direction decoding scan unit 254 and the vertical direction decoding scan unit 255 decode the base layer and the enhancement layer. Herewith, the base layer and the enhancement layer are inputted to the horizontal direction decoding scan unit 254 and the vertical direction decoding scan unit 255 at the same time, but the vertical direction decoding scan unit 255 receives the decoding data from the horizontal direction decoding scan unit 254, after that, executes the vertical decoding scanning, as explained in FIGS. 10 and 11.

In a case of coding after a symmetrical movement, it is a state that a screen was rotated. In order to return it to an original state, thus, converse symmetrical movement is executed. That is, in case that the base layer is through the symmetrical movement unit 253, the second switching unit 256 switches the enhancement layer outputted from the vertical direction decoding scan unit 255 to the converse symmetrical movement unit 257 in response to the switching control signal of the scan order decision unit 251. The converse symmetrical movement unit 258 symmetrically moves the enhancement layer inputted through the second switching unit 256 in an opposite direction to that of the symmetrical movement unit 253, to thereby generate and output an original enhancement layer which is not moved symmetrically.

FIG. 26 shows a flow chart providing a scalable decoding method in which a scan order is fixed and a scanning block is symmetrically moved, in the invention. In a step ST261, it is constructed that a scan order is predetermined, the decoding apparatus performs the decoding in the same scan order as that of the coding apparatus, e.g., the horizontal scanning first and the vertical scanning next, and data indicating the scan order, e.g., determining as "1", is determined. In afore-mentioned scan order deciding methods, it is detected what scan order can be used in order for a coding bit generation of small quantity, e.g., methods for deciding lengths of horizontal and vertical boundary lines on the base layer and deciding by additional information transmitted from the coding apparatus. In a step ST262, it is detected whether or not the decided scan order for the coding bit generation of small quantity is the fixation scan order. In a case of the fixation scan order, in a step ST264, the horizontal decoding scanning is first performed in the fixed scan order, and in a step ST265 the vertical decoding scanning is done next. In case that it is not the fixation scan order, the block is symmetrically moved in a step ST263, and the horizontal and vertical decoding scannings are done on it.

As afore-mentioned, in accordance with the present invention, the generating quantity of TSD and ESD and the generating bit number can be reduced in the total quantity by employ, differently from each other, a scan order of vertical and horizontal scannings based on a generation frequency of TSD and ESD or a type of boundary lines on images, in coding enhancement layers by utilizing a scan interleaving method, thereby heightening an efficiency of the coding.

It will be apparent to those skilled in the art that various modifications and variations can be made in the apparatus and method for coding/decoding scalable shapes in accordance with the present invention without departing from the spirit or scope of the invention. Thus, it is intended that the present invention cover the modifications and variations of this invention provided they come within the scope of the appended claims and their equivalents.

What is claimed is:

1. A method for decoding scalably shapes on a plurality of layers having mutually other resolution by using a scan interleaving method, said method comprising the steps of:

calculating the number of cases that vertically adjacent pixel values on a base layer are different from each other, N1, and horizontally adjacent pixel values on the base layer are different from each other, N2;

detecting whether or not the number of cases that the vertically adjacent pixel values are different from, N1, is larger than the number of cases that the horizontally adjacent pixel values are different from each other, N2; and deciding the scan order for executing the horizontal scanning first in a case of N1>N2 and performing the vertical scanning first in cases excepting N1>N2.

2. An apparatus for coding scalably shapes on a plurality of layers having mutually other resolution through a scanning based on a predetermined scan order in employing a scan interleaving method, said apparatus comprising:

base layer extraction means for extracting a base layer from shape information;

scan order decision means for comparing lengths of horizontal and vertical boundary lines on the base layer and outputting switching control signals according to its comparison result;

switching means for switching an enhancement layer and the base layer in response to the switching control signals outputted from said scan order decision means;

first symmetrical movement means for symmetrically moving said shape information centering on a diagonal line and outputting it;

second symmetrical movement means for symmetrically moving said base layer centering on the diagonal line and outputting it;

horizontal direction scan means for scanning the shape information and the base layer outputted through said switching means or said first and second symmetrical movement means in a horizontal direction; and vertical direction scan means for scanning the shape information and the base layer outputted through said switching means or said first and second symmetrical movement means in a vertical direction.

3. The apparatus of claim 2, wherein said scan order decision means detects a scan order, controls the switching means to output the shape information and the base layer to said horizontal and vertical direction scan means in case that its scan order is same as the predetermined scan order, and controls the switching means to switch the shape information and the base layer to said first and second symmetrical movement means in case that its scan order is not same as the predetermined scan order.

4. The apparatus of claim 2, wherein said first symmetrical movement means symmetrically moves the shape information centering on the diagonal line or rotates the shape information 90 degrees and outputs it; and said second symmetrical movement means symmetrically moves the base layer centering on the diagonal line or rotates the base layer 90 degrees and outputs it.

5. A method for decoding scalably shapes on a plurality of layers having mutually other resolution by using a scan interleaving method, said method comprising the steps of:

deciding an order of vertical and horizontal scannings on shape information or a base layer;

detecting whether or not the scan order decided in said deciding step is same as predetermined scan direction;

rotating the shape information 90 degrees or symmetrically moving the shape information centering on a diagonal line in case that the detecting result is not same; and executing a scanning in the predetermined scan order in the same case.

6. The method of claim 5, wherein the scan order decided in said deciding step is decided, to generate coding bits in a small quantity, by a direction of a boundary line, the number of TSDs (transitional sample data's), the number and ESDs (exceptional sample data's), the sum of TSD (transitional sample data) and ESD (exceptional sample data), the number of bits in coding the TSD, the number of bits in coding the ESD and the number of bits in coding the TSD (transitional sample data) and the ESD (exceptional sample data).

7. An apparatus for decoding scalably shapes on a plurality of layers having mutually other resolution through a scanning based on a predetermined scan order in employing a scan interleaving method, said apparatus comprising:

base layer decoding means for decoding a base layer in coding data;

scan order decision means for comparing lengths of horizontal and vertical boundary lines on the base layer and outputting switching control signals according to its comparison result;

first switching means for switching the base layer outputted from said base layer decoding means in response to the switching control signals outputted from said scan order decision means;

symmetrical movement means for symmetrically moving the base layer outputted through said first switching means centering on a diagonal line or rotating it 90 degrees and outputting it;

horizontal direction decoding scan means and vertical direction decoding scan means for performing a decoding scanning on shape information and the base layer outputted through said first switching means or symmetrical movement means in horizontal and vertical directions;

second switching means for switching data outputted from said vertical direction decoding scan means in response to the switching control signal outputted from said scan order decision means; and converse symmetrical movement means for symmetrically moving the data outputted through said second switching means in an opposite direction to said symmetrical movement means or rotating the data 90 degrees and outputting it.

8. The apparatus of claim 7, wherein said scan order decision means compares the lengths of the horizontal and vertical boundary lines and controls the switching means to switch the base layer to the symmetrical movement means, in case that the length of the horizontal boundary line is longer than that of the vertical boundary line.

9. The apparatus of claim 7, wherein said vertical direction decoding scan means receives decoding data from the horizontal direction decoding scan means, and then executes a vertical decoding scanning.

10. The apparatus of claim 7, wherein the switching control signal of said scan order decision means controls so that the second switching means may switch an enhancement layer outputted from the vertical direction decoding scan means to said converse symmetrical movement means in response to the switching control signal of the scan order decision means, in case that the first switching means controls the base layer to be switched to said symmetrical movement means.

11. A method for decoding scalably shapes on a plurality of layers having mutually other resolution by using a scan interleaving method, said method comprising the steps of:
    receiving additional information indicating a scan order;
    detecting whether or not the scan order represented in said additional information is same as a predetermined scan order;
    rotating shape information 90 degrees or symmetrically moving the shape information centering on a diagonal line in case that the detecting result is not same; and
    executing a decoding scanning in the predetermined scan order in the same case.

12. An apparatus for coding scalably shapes on a plurality of layers having mutually other resolution by using a scan interleaving method, said apparatus comprising:
    shape information extraction means for extracting shape information from inputted images and outputting it;
    base layer extraction means for extracting pixel data corresponding to a base layer from shape information data outputted from said shape information extraction means and outputting it;
    scan order decision means for comparing lengths of horizontal and vertical boundary lines on the base layer outputted from said base layer extraction means and outputting switching control signals according to its comparison result;

switching means for switching the shape information and the base layer in response to the switching control signals outputted from said scan order decision means;
    first direction scan means for receiving the base layer data and the shape information and executing a horizontal scanning first and a vertical scanning next;
    second direction scan means for receiving the base layer data and the shape information and performing the vertical scanning first and the horizontal scanning next;
    said scan order decision means controls the switching means to output the switching control signal for switching the shape information and the base layer to the second direction scan means, in case that the length of the horizontal boundary line is longer than the length of the vertical boundary line;
    said scan order decision means controls the switching means to output the switching control signal for switching the shape information and the base layer to the, first direction scan means, in case that the length of the vertical boundary line is longer than the length of the horizontal boundary line;
    said first direction scan means comprises:
    a horizontal direction scan means for executing the horizontal scanning; and
    a vertical direction scan means for performing the vertical scanning on data completed in a scanning process of said horizontal direction scan means, the shape information and the base layer data,
    said second direction scan means comprises a vertical direction scan means and a horizontal direction scan means in an opposite constructive order to that of said first direction scan means;
    said horizontal direction scan means comprises:
    coding pixel extraction means for extracting coding pixel from the shape information;
    horizontal adjacent pixel extraction means for extracting pixels positioned on the right and left of the pixel extracted by said coding pixel extraction means;
    first comparison means for comparing pixels adjacent to said coding pixel outputted from said horizontal adjacent pixel extraction means and outputting the switching control signals;
    first switching means for switching the coding pixel and horizontal adjacent pixels in response to the switching control signal of said first comparison means;
    second comparison means for comparing the coding pixel and adjacent pixels and outputting the switching control signals;
    second switching means for switching the coding pixel and the horizontal adjacent pixels in response to the switching control signal of said second comparison means;
    TSD (transitional sample data) coding means for encoding the coding pixel outputted through said first switching means; and
    ESD (exceptional sample data) coding means for encoding the coding pixel outputted through said second switching means.

13. The apparatus of claim 12, wherein said horizontal adjacent pixel extraction means executes a coding for a first row and first column of an enhancement layer by using a pixel value belonging to a corresponding position of an adjacent block or doubly using a first row and first column of the base layer.

14. The apparatus of claim 13, wherein said vertical direction scan means comprises:

coding pixel extraction means for receiving the shape information and horizontal direction coding data outputted from said horizontal direction scan means and extracting the coding pixel from the shape information and the coding data;

vertical adjacent pixel extraction means for receiving the horizontal direction coding data outputted from said horizontal direction scan means and the base layer data and extracting pixels positioned on the upper and lower sides of the pixel extracted by said coding pixel extraction means;

third comparison means for comparing with each other vertical adjacent pixels outputted from said vertical adjacent pixel extraction means and outputting the switching control signals according to its comparison result;

first switching means for switching the coding pixel and the horizontal adjacent pixels in response to the switching control signal of said third comparison means;

fourth comparison means for comparing the coding pixel and adjacent pixels and outputting the switching control signals;

second switching means for switching the coding pixel and the vertical adjacent pixels in response to the switching control signal of said fourth comparison means;

TSD (transitional sample data) coding means for encoding the coding pixel outputted through said first switching means; and ESD (exceptional sample data) coding means for encoding the coding pixel outputted through said second switching means.

15. The apparatus of claim 14, wherein said vertical adjacent pixel extraction means executes a coding for the first row and first column of the enhancement layer by using a pixel value belonging to a corresponding position of an adjacent block or doubly using the first row and first column of the base layer.

16. An apparatus for decoding scalably shapes on a plurality of layers having mutually other resolution by utilizing a scan interleaving method, said apparatus comprising:

base layer decoding means for receiving and decoding base layer coding data transmitted from a coding apparatus;

scan order decision means for comparing lengths of horizontal and vertical boundary lines on the base layer outputted from said base layer decoding means and outputting switching control signals according to its comparison result;

switching means for switching coding data transmitted from the coding apparatus and base layer data outputted from said base layer decoding means in response to the switching control signals outputted from said scan order decision means;

first direction scan decoding means for receiving the base layer data and the coding data and executing a horizontal decoding scanning first and a vertical decoding scanning next;

second direction scan decoding means for receiving the base layer data and the coding data and performing the vertical decoding scanning first and the horizontal decoding scanning next;

said scan order decision means controls the switching means to output the switching control signal for switching the shape information and the base layer to the second direction scan decoding means, in case that the length of the horizontal boundary line is longer than the length of the vertical boundary line;

said scan order decision means controls the switching means to output the switching control signal for switching the shape information and the base layer to the first direction scan decoding means, in case that the length of the vertical boundary line is longer than the length of the horizontal boundary line;

said first direction scan decoding means comprising:

a horizontal direction decoding scan means for executing the horizontal decoding scanning; and a vertical direction decoding scan means for performing the vertical decoding scanning on data completed in a scanning process of said horizontal direction decoding scan means, the coding data and the base layer data;

said second direction scan decoding means comprises a vertical direction decoding scan means and a horizontal direction decoding scan means in an opposite constructive order to that of said first direction scan decoding means;

said horizontal direction decoding scan means comprising:

horizontal adjacent pixel extraction means for extracting pixels positioned on the right and left of decoding pixel from said base layer;

comparison means for comparing pixels adjacent to said decoding pixel outputted from said horizontal adjacent pixel extraction means and outputting the switching control signals;

first switching means for switching the coding data and horizontal adjacent pixels in response to the switching control signal of said comparison means;

second switching means for switching the horizontal adjacent pixels and the coding data transmitted from the coding apparatus according as corresponding decoding data among the coding data belongs to an ESD (exceptional sample data) or does not belong to the ESD (exceptional sample data);

TSD (transitional sample data) decoding means for decoding the coding data outputted through said first switching means;

ESD (exceptional sample data) decoding means for decoding the coding pixel outputted through said second switching means; and adjacent pixel copy means for storing horizontal adjacent pixel values of decoding pixels not belonging to a TSD (transitional sample data) or the ESD (exceptional sample data).

17. The apparatus of claim 16, wherein said horizontal adjacent pixel extraction means executes a decoding for a first row and first column of an enhancement, layer by using a pixel value belonging to a corresponding position of an adjacent block or doubly using a first row and first column of the base layer.

18. An apparatus for decoding scalably shapes on a plurality of layers having mutually other resolution by utilizing a scan interleaving method, said apparatus comprising:

base layer decoding means for receiving and decoding base layer coding data transmitted from a coding apparatus;

scan order decision means for comparing lengths of horizontal and vertical boundary lines on the base layer outputted from said base layer decoding means and outputting switching control signals according to its comparison result;

switching means for switching coding data transmitted from the coding apparatus and base layer data outputted from said base layer decoding means in response to the switching control signals outputted from said scan order decision means;

first direction scan decoding means for receiving the base layer data and the coding data and executing a horizontal decoding scanning first and a vertical decoding scanning next;

second direction scan decoding means for receiving the base layer data and the coding data and performing the vertical decoding scanning first and the horizontal decoding scanning next;

said first direction scan decoding means comprising:

a horizontal direction decoding scan means for executing the horizontal decoding scanning;

a vertical direction decoding scan means for performing the vertical decoding scanning on data completed in a scanning process of said horizontal direction decoding scan means, the coding data and the base layer data;

said second direction scan decoding means comprises a vertical direction decoding scan means and a horizontal direction decoding scan means in an opposite constructive order to that of said first direction scan decoding means;

said vertical direction decoding scan means comprises:

vertical adjacent pixel extraction means for receiving the horizontal direction decoding data outputted from said horizontal direction decoding scan means, the coding data and the base layer data, and extracting pixels positioned on the upper and lower sides of the decoding pixel;

comparison means for comparing with each other vertical adjacent pixels outputted from said vertical adjacent pixel extraction means and outputting the switching control signals according to its comparison result;

first switching means for switching the coding data, horizontal decoding data and the horizontal adjacent pixels in response to the switching control signal of said comparison means;

second switching means for switching the vertical adjacent pixels and the coding data transmitted from the coding apparatus according as corresponding decoding data among the coding data belongs to the ESD (exceptional sample data) or does not belong to the ESD (exceptional sample data);

TSD (transitional sample data) decoding means for decoding the coding data outputted through said first switching means;

ESD (exceptional sample data) decoding means for decoding the coding data outputted through said second switching means; and adjacent pixel copy means for storing horizontal adjacent pixel values of decoding pixels not corresponding to the TSD (transitional sample data) or the ESD (exceptional sample data).

19. The apparatus of claim 18, wherein said vertical adjacent pixel extraction means executes a decoding for the first row and first column of the enhancement layer by using a pixel value belonging to a corresponding position of an adjacent block or doubly using the first row and first column of the base layer.

20. A method for coding scalably shapes on a plurality of layers having mutually other resolution by using a scan interleaving method, said method comprising the steps of:

deciding a scan order of vertical and horizontal scanning, said scan order being for generating coding bits in a small quantity;

detecting whether or not the scan order decided in said deciding step is as a priority order of the vertical scanning;

executing first the vertical scanning in a preferential case of the vertical scanning and the horizontal scanning next;

performing first the horizontal scanning in a preferential case of the horizontal scanning and the vertical scanning next;

the scan order deciding step comprises the steps of:

calculating the number of cases that vertically adjacent pixel values are different from each other and horizontally adjacent pixel values are different from each other, on a base layer extracted from shape information;

detecting whether or not number of cases that the vertically adjacent pixel values are different from, N1, is larger than the number of cases that the horizontally adjacent pixel values are different from, N2; and deciding the scan order for executing the horizontal scanning first in a case of N1>N2, and performing the vertical scanning first in cases excepting N1>N2.

21. A method for coding scalably shapes on a plurality of layers having mutually other resolution by using a scan interleaving method, said method comprising the steps of:

deciding a scan order of vertical and horizontal scanning, said scan order being for generating coding bits in a small quantity;

detecting whether or not the scan order decided in said deciding step is a priority order of the vertical scanning;

executing first the vertical scanning in a preferential case of the vertical scanning and the horizontal scanning next;

performing first the horizontal scanning in a preferential case of the horizontal scanning and the vertical scanning next;

said scan order deciding step comprises the steps of:

calculating the coding number of TSDs (transitional sample data's) and ESDs (exceptional sample data's) in the horizontal scanning, (N_H), and computing the coding number of TSDs (transitional sample data's) and ESDs (exceptional sample data's) in the vertical scanning, (N_V), on shape information;

adding up said N_H and N_V and computing the total number of TSDs (transitional sample data's) and ESDs (exceptional sample data's), (N_HV), which is generated in a horizontal direction priority scan order;

counting the coding number of TSDs (transitional sample data's) and ESDs (exceptional sample data's) in the vertical scanning, (N_V), and calculating the coding number of TSDs (transitional sample data's) and ESDs (exceptional sample data's) in the horizontal scanning, (N_H), on said preferential case of the horizontal scanning and the vertical scanning next.

22. A method for coding scalably shapes on a plurality of layers having mutually other resolution by using a scan interleaving method, said method comprising the steps of:

deciding a scan order of vertical and horizontal scanning, said scan order being for generating coding bits in a small quantity;

detecting whether or not the scan order decided in said deciding step is a priority order of the vertical scanning;

executing first the vertical scanning and the horizontal scanning next;

performing first the horizontal scanning and the vertical scanning next;

said scan order deciding step comprises the steps of:

calculating the coding number of TSDs (transitional sample data's) and ESDs (exceptional sample data's) in the horizontal scanning, (N_H), and computing the coding number of TSDs (transitional sample data's) and ESDs (exceptional sample data's) in the vertical scanning, (N_V), on shape information;

adding up said N_H and N_V and computing the total number of TSDs (transitional sample data's) and ESDs (exceptional sample data's), (N_HV), which is generated in a horizontal direction priority scan order;

counting the coding bits of the TSD (transitional sample data) (ESD) (exceptional sample data) in the vertical scanning, (N_V), and calculating the coding bits of the TSD (transitional sample data) (ESD) (exceptional sample data) in the horizontal scanning, (N_H), on said shape information;

summing up said N_H and N_V and computing the total coding bits of the TSD (transitional sample data) (ESD) (exceptional sample data), (N_VH), which is generated in the vertical direction priority scan order;

detecting whether or not it is N_HV>N_VH;

deciding the scan order in which the vertical scanning is preferentially executed in a case of N_HV>N_VH, and the horizontal scanning is preferentially executed in case that it is not N_HV>N_VH; and transmitting the scan order decided in the deciding step to the decoder.

23. A method for coding scalably shapes on a plurality of layers having mutually other resolution by using a scan interleaving method, said method comprising the steps of:

deciding a scan order of vertical and horizontal scanning, said scan order being for generating coding bits in a small quantity;

detecting whether or not the scan order decided in said deciding step is a priority order of the vertical scanning;

executing first the vertical scanning and the horizontal scanning next;

performing first the horizontal scanning and the vertical scanning next;

said scan order deciding step comprises the steps of:

calculating the sum of TSDs (transitional sample data's) and ESDs (exceptional sample data's) in the horizontal scanning, (N_H), and computing the sum of TSD (transitional sample data) and ESD (exceptional sample data) in the vertical scanning, (N_V), on shape information;

adding up said N_H and N_V and computing the total number of TSD (transitional sample data) and ESD (exceptional sample data), (N_HV), which is generated in a horizontal direction priority scan order;

counting the sum of TSD (transitional sample data) and ESD (exceptional sample data) in the vertical scanning, (N_V), and calculating the sum of TSD (transitional sample data) and ESD (exceptional sample data) in the horizontal scanning, (N_H), on said shape information;

summing up said N_H and N_V and computing the total coding bits of the TSD (transitional sample data) (ESD) (exceptional sample data), (N_VH), which is generated in the vertical direction priority scan order;

detecting whether or not it is N_HV>N_VH;

deciding the scan order in which the vertical scanning is preferentially executed in a case of N_HV>N_VH, and the horizontal scanning is preferentially executed in case that it is not N_HV>N_VH; and transmitting the scan order decided in the deciding step to the decoder.

24. A method for coding scalably shapes on a plurality of layers having mutually other resolution by using a scan interleaving method, said method comprising the steps of:

deciding a scan order of vertical and horizontal scanning, said scan order being for generating coding bits in a small quantity;

detecting whether or not the scan order decided in said deciding step is a priority order of the vertical scanning;

executing first the vertical scanning and the horizontal scanning next;

performing first the horizontal scanning and the vertical scanning next;

said scan order deciding step comprises the steps of:

calculating the sum of TSDs (transitional sample data's) and ESDs (exceptional sample data's) in the horizontal scanning, (N_H), and computing the sum of TSD (transitional sample data) and ESD (exceptional sample data) in the vertical scanning, (N_V), on shape information;

adding up said N_H and N_V and computing the total number of TSD (transitional sample data) and ESD (exceptional sample data), (N_HV), which is generated in a horizontal direction priority scan order;

counting the sum of TSD (transitional sample data) and ESD (exceptional sample data) in the vertical scanning, (N_V), and calculating the sum of TSD (transitional sample data) and ESD (exceptional sample data) in the horizontal scanning, (N_H), on said shape information;

summing up said N_H and N_V and computing the total coding bits of the TSD (transitional sample data) (ESD) (exceptional sample data), (N_VH), which is generated in the vertical direction priority scan order;

detecting whether or not it is N_HV>N_VH;

deciding the scan order in which the vertical scanning is preferentially executed in a case of N_HV>N_VH, and the horizontal scanning is preferentially executed in case that it is not N_HV>N_VH; and transmitting the scan order decided in the deciding step to the decoder.

* * * * *